United States Patent [19]

Palmer et al.

[11] E Patent Number: Re. 33,629

[45] Reissued Date of Patent: Jul. 2, 1991

[54] NUMERIC DATA PROCESSOR

[75] Inventors: John F. Palmer, Cambridge, Mass.; Bruce W. Ravenel, Nederland, Colo.; Rafi Nave, Haifa, Israel

[73] Assignee: Intel Corporation, Santa Clara, Calif.

[21] Appl. No.: 461,538

[22] Filed: Jun. 1, 1990

Related U.S. Patent Documents

Reissue of:

[64] Patent No.: 4,338,675
Issued: Jul. 6, 1982
Appl. No.: 120,995
Filed: Feb. 13, 1980

[51] Int. Cl.[5] ..... G06F 7/48; G06F 9/00; G06F 11/00

[52] U.S. Cl. ..... 364/748; 364/737; 364/745; 364/258

[58] Field of Search ..... 364/748, 745, 737, 736, 364/200

[56] References Cited

U.S. PATENT DOCUMENTS

| | | | |
|---|---|---|---|
| 3,434,114 | 3/1969 | Arulpragasam et al. | 364/745 |
| 3,594,565 | 7/1971 | Ragen | 364/745 |
| 3,603,934 | 9/1971 | Heath, Jr. et al. | 364/737 |
| 3,871,578 | 3/1975 | Van De Goor et al. | 364/748 |
| 3,905,025 | 9/1975 | Davis et al. | 364/200 |
| 4,021,655 | 5/1977 | Healey et al. | 364/200 |

OTHER PUBLICATIONS

Moore, R. E., *Interval Analysis*, 1966, Prentice-Hall, Inc.

Kahan, W., "A More Complete Interval Arithmetic," Jun. 17-21, 1968, *Lecture Notes.*

Dekker, T. J., "A Floating Point Technique for Extending the Available Precision," 1971, Numerishe Mathematik vol. 18, pp. 224-242.

Brent, R., "On the Precision Attainable with Various Floating Point Systems," *IEEE Transactions on Computers*, vol. C-22, 1973, pp. 601-607.

Yohe, J. "Roundings in Floating-Point Arithmetic," 1973, *IEEE Transactions on Computers* vol. C-22, pp. 577-586.

Bulman, D. M. "Stack Computers: An Introduction," May 1977, *Computer* pp. 18-28.

Siewiorek, Daniel P.; Bell, C. Gordon; Newell, Allen, "Computer Structures: Principles and Examples," 1977, Chapter 29, pp. 470-485 McGraw-Hill Book Co.

Palmer, John F., "The Intel Standard for Floating-Point Arithmetic," Nov. 8-11, 1977, *IEEE COMPSAC 77 Proceedings*, 107-112.

Coonen, J. T., "Specifications for a Proposed Standard for Floating-Point Arithmetic," Oct. 13, 1978, Mem. #USB/ERL M78172, pp. 1-32.

Pittman, T. and Stewart, R. G., "Microprocessor Standards," 1978, AFIPS Conference Proceedings, vol. 47, pp. 935-938.

"7094-II System Support For Numerical Analysis," by William Kahan, Dept. of Computer Science, Univ. of Toronto, Aug. 1966, pp. 1-51.

"A Unified Decimal Floating-Point Architecture For The Support of High-Level Languages,' by Frederic N. Ris, Yorktown Heights, N.Y. (Oct. 1978), Signum newsletter 11 #3, pp. 18-23.

Goldberg, "27 Bits are not Enough for 8-Digit Accuracy" *Communications of the ACM*, vol. 10, No. 2, Feb. 1967, pp. 105-106.

Haley, A. C. D., "The KDF.9 Computer System", English Electric Co., Ltd., Kidsgrove, Stoke-on-Trent, England, Proceedings—Fall Joint Computer Conference (1962), pp. 108-120.

Am9511A, MOS/LSI Data Book (1980), pp. 7-66 to 7-73.

Am9512, MOS/LSI Data Book (1980), pp. 7-91 to 7-99.

Haddon, B. K. and Waite, W. M., "Experience with the Universal Intermediate Language Janus", Software--Practice and Experience, vol. 8, pp. 601-616, (1978).

Gentleman, W. M. and Marovich, S. B., "More on Algorithms that Reveal Properties of Floating Point Arithmetic Units", Communications of the ACM, vol. 17, No. 5, May 1974, pp. 276-277.

August, et al., System Architecture Reference Guide, Prime Computer, Inc., Framingham, Massachusetts, Jul. 1983 (First Edition, Apr. 1979), pp. iii, 6-23, 6-25.

Cates, Julia, "F-Series Extends Computing Power of

HP 1000 Computer Family", H-P Journal, Oct. 1978, pp. 1, 15, 16.
Hull, T. E. and Swenson, J. R., "Tests of Probabilistic Models for Propagation of Roundoff Errors", Communications of the ACM, vol. 9, No. 2, Feb. 1966, pp. 108-113.
Kahan, William, "A Survey of Error Analysis", Computer Science Dept. University of California, Berkeley, California, Information Processing 71, North-Holland Publishing Co., (1972), pp. 1214-1239.
The 8086 Family User's Manual, Numerics Supplement, Jul. 1980, pp. S-1 and S-2, Intel Corporation.
8080/8085 Floating-Point Arithmetic Library User's Manual, Intel Corp. 1979.
SBC 310 High-Speed Mathematics Unit Hardware Reference Manual, Intel Corp., 1977.
8232 Floating Point Processor, Intel Corp., Sep. 1979.
PDP-11 Processor Handbook, 1978-79 Revision, DEC, pp. 246-301.
System/370 Principles of Operation, IBM, pp. 157-170.
Palmer, J. and Baron, J., "A Partial 8087 Emulator", External Reference Specification, Intel Corp., Rev. O, 12/30/77.
Baron, J., Optimized Partial 8087 Emulator, Product Requirement Document, Intel Corp., 10/2/78.

*Primary Examiner*—David H. Malzahn

*Attorney, Agent, or Firm*—Arnold, White & Durkee

[57] ABSTRACT

A floating point, integrated, arithmetic circuit is organized around a file format having a floating point numeric domain exceeding that of any single or double precision floating point numbers, long or short integer words or BCD data upon which it must operate. As a result the circuit has a greater reliability, range and precision than ever previously achieved without entailing additional circuit complexity. Reliability is further enhanced by a systematic three bit rounding field, and by including means for detecting every error or exception condition with an optional expected response provided thereto by hardware. As a result of such organization, an unexpected increase of capacity is achieved wherein transcendental functions can be computed totally in hardware, and whereby mixed mode arithmetic can be implemented without difficulty. The numeric processor also includes a programmable shifter capable of arbitrary numbers of bit and byte shifts in a single clock cycle, as well as an arithmetic unit capable of implementing multiplication, division, modulo reduction and square roots directly in hardware.

5 Claims, 7 Drawing Sheets

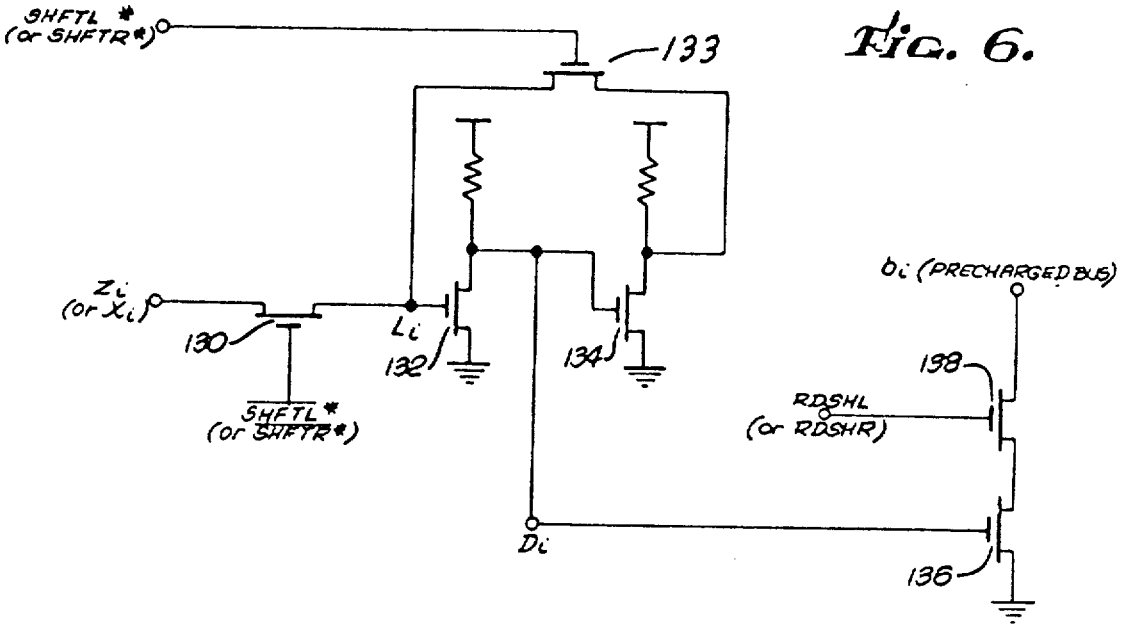
Fig. 6.
Fig. 7.
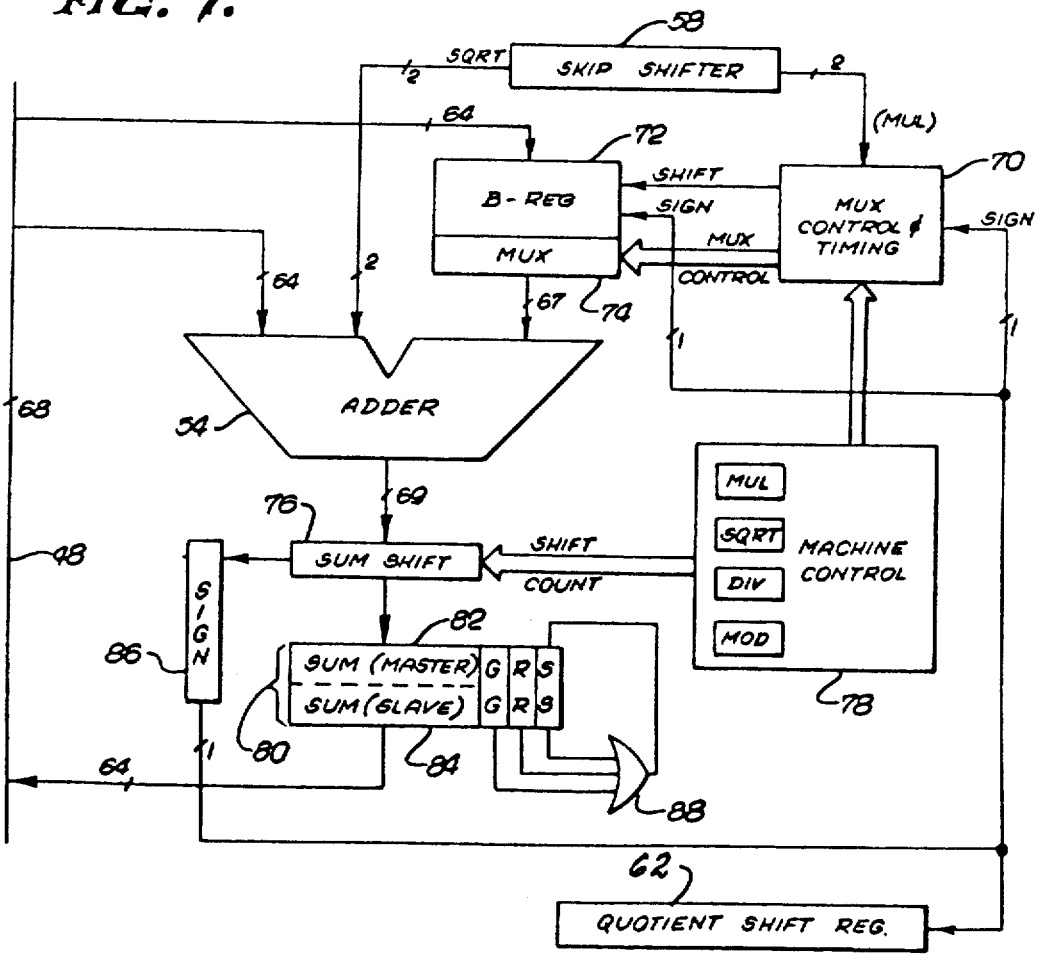

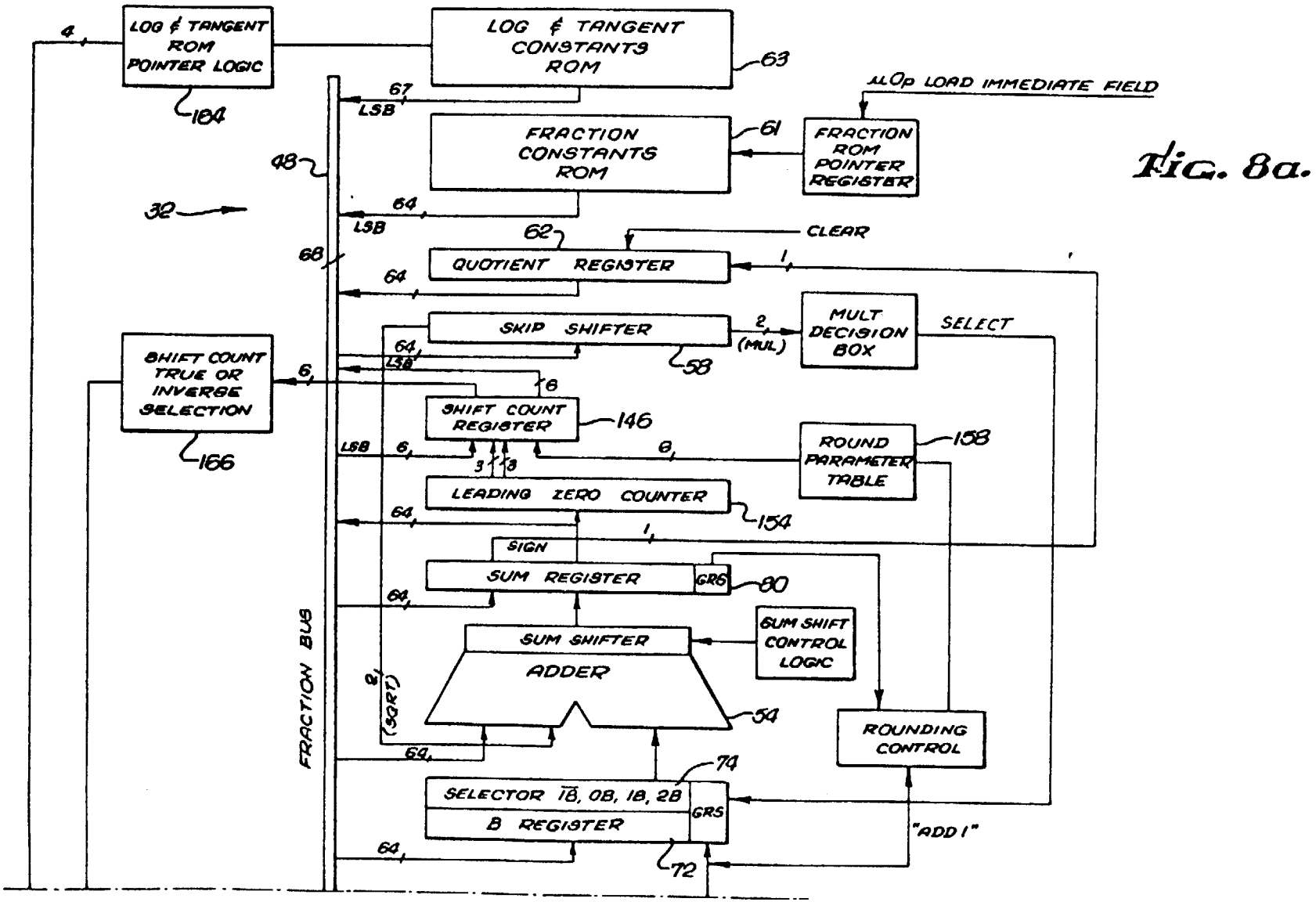
Fig. 8a.
μOp LOAD IMMEDIATE FIELD
FRACTION ROM POINTER REGISTER
CLEAR
SELECT
MULT DECISION BOX
ROUND PARAMETER TABLE
ROUNDING CONTROL
"ADD 1"
SUM SHIFT CONTROL LOGIC
LOG & TANGENT CONSTANTS ROM
FRACTION CONSTANTS ROM
QUOTIENT REGISTER
SKIP SHIFTER
SHIFT COUNT REGISTER
LEADING ZERO COUNTER
SIGN
SUM REGISTER
SUM SHIFTER
ADDER
SELECTOR 1B, 0B, 1B, 2B
B REGISTER
GRS
(MUL)
(SQRT)
LSB
FRACTION BUS
LOG & TANGENT ROM POINTER LOGIC
SHIFT COUNT TRUE OR INVERSE SELECTION
63
61
62
58
146
154
60
54
74
72
158
184
166
32
48
68

NUMERIC DATA PROCESSOR

Matter enclosed in heavy brackets [ ] appears in the original patent but forms no part of this reissue specification; matter printed in italics indicates the additions made by reissue.

TABLE OF CONTENTS

BACKGROUND OF THE INVENTION
1. Field of the Invention
2. Description of Prior Art
BRIEF SUMMARY OF THE INVENTION
BRIEF DESCRIPTION OF THE DRAWINGS
DETAILED DESCRIPTION OF THE PREFERRED EMBODIMENT
I. General Discussion of Data and Numeric Representations
II. General Introduction to the System Context of the Numeric Processor of the Present Invention
III. Arithmetic Operations of the Numeric Processor
A. Multiplication
B. Division
C. Modulus Arithmetic
D. Square Root
E. Rounding Apparatus and Methodology
F. Programmable Shifter
IV. Architecture and Organization of the Floating Point Execution Unit
A. General Discussion
B. Handling of Denormalized and Unnormalized Numbers
C. Signed Zero and Infinity Generation and Handling
V. Summary And Advantages of the Invention
CLAIMS
TABLE 1
TABLE 2

BACKGROUND OF THE INVENTION

1. Field of the Invention

The present invention relates to the field of numeric data processors and in particular, relates to integrated circuit, floating point numerical processors capable of mixed precision calculations, mixed mode arithmetic calculations and rounding operations.

2. Description of the Prior Art

Prior art arithmetic processors, particularly integrated circuit processors, are characterized by various artifacts of inaccuracy, unreliability and lack of safety during floating point calculations. For example, a typical prior art, integrated circuit process is capable of performing transcendental mathematical operations, including square root, in such a manner that the result is not only obtained relatively slowly, often only with software assistance, but subject to the possibility of multiple rounding errors in intermediate results leading to an inaccurate final answer and with no internal mechanism within the processor to either detect or correct the rounding errors. In addition, prior art processors generally cannot operate with mixed mode operands or can do so only with the substantial risk of producing erroneous results.

What is needed then is an arithmetic processor having sufficient internal precision to make quick, accurate and reliable calculations of single and double precision integers and floating point quantities with internal means to deal with rounding errors and other arithmetic exceptions or special cases such as zero and infinity arithmetic.

BRIEF SUMMARY OF THE INVENTION

The present invention includes an improvement in a numeric data processor for performing calculations on a plurality of data formats representable by a fraction and exponent representation comprising a first means or circuit for converting the plurality of the formats to a file format wherein the file format has a numeric fraction and exponent domain greater than any one of the plurality of data formats. A fraction and exponent bus is coupled to this first means or circuit for converting the plurality of data formats. A stack of registers, which are configured to store numeric information in the file format, are coupled to the exponent and fraction bus. An arithmetic unit which is used to perform arithmetical operations in file format on the numeric information is also coupled to the fraction bus. By reason of this combination of elements, the reliability of computation is substantially increased since all data formats are converted to a file format which has a greater range of bits in the significand and a greater exponent range than any of the numerical quantities which the numeric processor may be called upon to manipulate. Generally, then, the only errors which are likely to occur are errors in conversion and transfer rather than in computation. This combination allows mixed mode arithmetic since the file format is able to include all data formats after their conversion.

The present invention also includes a circuit or means for detecting and indicating numeric exceptions or errors during any computational operation and for handling of such exceptions or errors. A third means or circuit for selectively masking a response to the numeric exceptions is also included within the numeric processor. A fourth means or circuit then selectively provides a specific response to each exception which is capable of identification and is active when the exception is masked. The fourth circuit is coupled to the second and third circuits so that a response is generated whenever detected and identified by the second circuit and when masked by the third circuit. As a result of this combination of elements, an exception or error indication is generated in each and every instance in which an error or exception occurs during computation. The user is then given the option by masking, either to generate an interrupt to stop processing, or to continue computation by inserting, at that point in the computation, a specific response which is determined by the precise circumstances of the exception or error which has occurred. However, the indication that an error has occurred is not lost and remains stored within the numeric processor throughout the entire computation so that the user has the option of being aware of the precise nature and occurrence of the exception or error and taking appropriate software measures should the exception or error prove to be unacceptably unreliable.

By virtue of the above combination, the numeric data processor may handle both signed zeros and signed infinity and thereby be able to include within its capacity the capability to do interval arithmetic both in the affine and projective closures.

Furthermore, the present invention includes a means for rounding the numeric information according to a selected one of a plurality of rounding modes. The rounding is effected by appending to each numeric quantity three additional bits, a guard, round and sticky bit, wherein all right shifted bits are captured in the guard, round or sticky bit, the latter of which is the or function of all previously right shifted bits.

As a result of this rounding capability in the numeric processor, the numeric processor includes a means for performing exact arithmetic by being able to detect and indicate by a precision flag, a P flag, whenever rounding has occurred. In the case where exact arithmetic must be computed, an interrupt can be generated in response thereto.

The present invention also includes a programmable bidirectional shifter which is comprised of a first bidirectional shifter which is comprised of a first bidirectional load and read interface circuit selectively activated for left shifts, and a similarly constituted second bidirectional load and interface circuit which is selectively activated for right shifts. The first interface circuit is coupled to a byte shift matrix while the second interface circuit is coupled to a bit shift matrix. The byte shift matrix is arranged and configured to shift the input quantity by a multiple of bytes, namely multiples of eight bits. The bit shift matrix is similarly constituted to shift its input quantity by a selected number of bit locations up to seven consecutive places. The bit and byte shift matrices are coupled to allow bidirectional flow of signals therebetween. The bit and byte matrix are controlled by a bit and byte shift control circuit respectively which determines the number of bytes and bit places each matrix will actually shift. By reason of this combination of elements, a numeric quantity of virtually arbitrary length may be selectively shifted by an arbitrary number of bit places during a single clock cycle and by the use of simple circuitry.

The present invention also includes an improvement in a method of calculating numeric quantities having a plurality of data formats representable by a fraction and exponent representation comprising the steps of converting the plurality of data formats to a file format in a conversion means whereby the file format has an exponent and fraction numeric domain greater than any one of the plurality of data formats. The converted data is then stored in file format within a stack of registers and selectively coupled to a fraction and exponent bus, also in file format. The file format numeric quantities on the fraction and exponent bus are then selectively coupled to an arithmetic unit which performs arithmetic operations on those numeric quantities in file format. For the reasons set forth above, execution and conversion of numeric quantities into and from the file format of the present invention virtually eliminates computational errors and unreliability which were previously inherent to numeric processors.

The present invention also includes an improvement in the method for calculating numeric quantities comprising the steps of detecting numeric exceptions during computational operations in a numeric processor. All numeric exceptions or errors are detected. The nature of the exception or error detected is then indicated in an appropriate status register. A response is then generated within the numeric processor which is specific to the indicated exception or error, including the exception of operations employing and resulting in signed zeros and infinity. Finally, certain ones of these generated responses or indicated errors may be selectively masked so that computation continues according to the specific and reliable response indicated, rather than generating an interrupt and allowing the software user to determine what response should be made.

These and other aspects of the present invention can be better understood by reviewing the following figures in light of the detailed description of the preferred embodiments.

BRIEF DESCRIPTION OF THE DRAWINGS

FIG. 6 is a schematic diagram of a read interface unit utilized by the programmable shifter.

FIG. 7 is a simplified block diagram of the nanomachine portion of the floating point execution unit wherein multiplication, division, modulo reduction and square roots are implemented directly in hardware.

FIGS. 8*a* and 8*b* is a detailed block diagram illustrating the entire floating point execution unit of the present invention.

DETAILED DESCRIPTION OF THE PREFERRED EMBODIMENT

I. GENERAL DISCUSSION OF DATA AND NUMERIC REPRESENTATIONS

Figure 1:
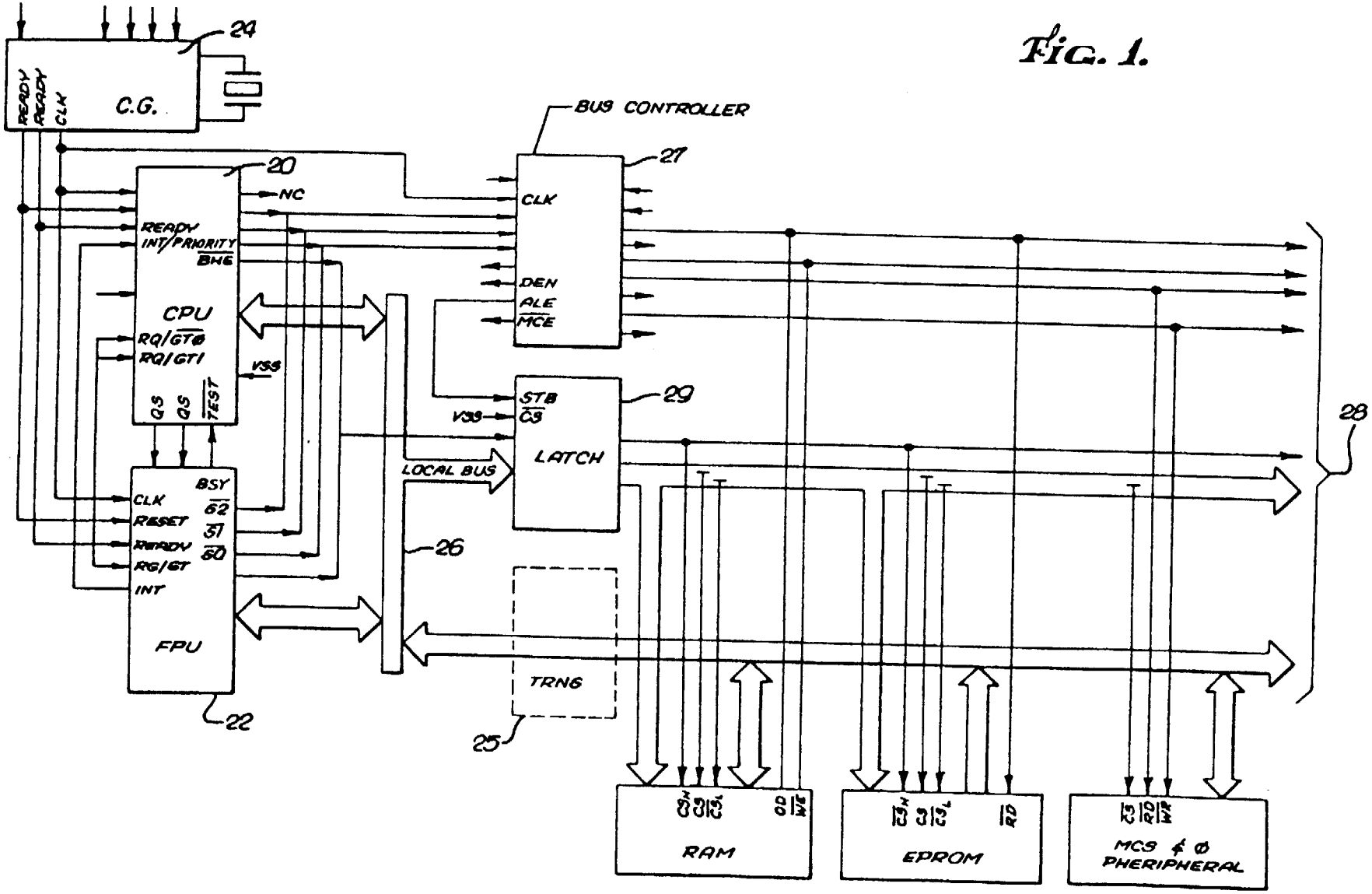
FIG. 1 is a block diagram schematically showing the system and environment in which the numeric processor of the present invention is used, namely in conjunction with a central processing unit having access to external peripherals and memory.

In order to understand methodology and apparatus of the present invention, consider first the basic representational formulas for numerical data which the numeric processors must accommodate. According to the present invention, the data structure consists of five general data types: real long and short; integer long and short; and BCD integer.

Additionally, there are a number of special numbers which must be handled as exceptions. Plus and minus zero form a special class as a result of their special nature in arithmetic operations. Similarly, plus and minus infinity are used to represent positive and negative numbers with a magnitude greater than that of the largest representable number. A normalized number is defined as a real number having all significant bits in the fraction or significand. Denormalized numbers are those numbers which have an exponent equal to that of the smallest representable normalized number, but which have significands which are allowed to have leading zeros. Finally, when no numeric result can be represented, such as in the case of division of zero by zero, a "not a number (NAN)" of "IND" can be provided. Thus, underflow and overflow, rather than aborting the numerical operation when occurring, can be dealt with by the use of plus and minus infinity, denormalized numbers and NAN's.

In the following description let P equals the sign bit E equals the exponents; S the significand or fraction; and X the general numeric variable.

Consider first the specific definition of normalized numbers in both short and long word storage formats, i.e., in the format suitable for memory storage. The range of the number is $2^{-1022} \leqq x \leqq (2-2^{-52})2^{1023}$ and is characterized by a biased eleven bit exponent, E, which is $1 \leqq E \leqq 2046$, which has a leading implicit one bit in a significant followed by 52 expressly spcified bits. Thus, the interpretation of the long or double precision normalized number is $x=(-1)^P 2^{E-1023}(\text{"1"}+S2^{-52})$ where "1" is an implicit one.

By the same token, the definition of a short word or single precision normalized number in memory is $$X=(-1)^P 2^{E-127}(\text{"1"}+S2^{-23})$$

thereby having a range of $$2^{31\ 126} \leqq x \leqq (2-2^{-23})2^{127}$$

and characterized by an eight bit biased exponent $1 \leqq E \leqq 254$. In this case, the significand begins with an implicit leading 1 bit followed by 23 expressly specified bits.

The normalized representation of an extended or file format of the present invention is described in the presently illustrated embodiment as a normalized number having a 15 bit biased exponent with a 64 bit significand characterized by explicit leading 1 bit. In other words, the file format is $x=(-1)^P 2^{E-16383}(S2^{-63})$ where $1 \leqq E \leqq 32766$ and where $E=2^{15}-1$ is reserved for infinities, invalids and indefinites.

Plus and minus zero is characterized by a biased exponent and significand both having a zero value. Thus, in the file format, the plus or minus zero is characterized by the number having the smallest exponent e.g. zero, and zeroes for the significand or by a number having a corresponding zero flag tagged thereto.

Similarly, denormalized numbers in memory, which are clustered about zero, have a range given by $2^{-126}(2^{-23}) \leqq x \leqq 2^{-126}(1-2^{-23})$ in single precision and $2^{-1022}2^{-52} \leqq |x| \leqq 2^{-1022}(1-2^{-52})$ in double precision. Denormalized numbers in memory are characterized in each case by a biased exponent equal to zero and interpreted as $x=(-1)^P(2^{-126})$ $(S\ 2^{-23})$ in single precision and $x=(-1)^P(2^{-1022})$ $(S\ 2^{-52})$ in double precision.

In the file or extended format of the present invention a denormalized number has the range $(2^{-63})2^{-16382} \leqq x \leqq 2^{-16382}(1-2^{-63})$, is characterized by a leading zero bit in the significand and is interpreted as $x=(31\ 1)^P 2^{-16382}(S\ 2^{-63})$. Plus and minus infinity as described in the presently illustrated embodiment is characterized by a number in the single or double precision memory format has having a binary exponent of all ones and a zero significand. In the file format, plus and minus infinity is characterized by the most positive exponent representable and a significand, 1.000 . . . 0, with a corresponding invalid flag tagged to the number.

Finally, a NAN or a "not a number" is defined in the presently illustrated embodiment as having, in single or double precision, all ones in the exponent and a nonzero significand. In the file format, NAN similarly has the most positive exponent representable and any significand not equal to 1.000 . . . 0 and, as before, a corresponding invalid flag tagged to the number. In such a case, the use of an actual significand is left to the user. Thus, it is possible that the value of the significand can be used to initialize storage such that when the storage is utilized by the user, these large magnitude NAN's will propagate through the arithmetic operations and indicate to the user that an error occured and program logic incorrectly accessed a nonutilized area of storage. Similarly, a NAN generated by an arithmetic operation and numeric data such as zero divided by zero may be used as a pointer by assignment of its significand to the offending portion of code. Many other uses as well can be devised for specially coding and employing significands in NAN's.

In addition to the double and real normalized and denormalized, and special cases described above, the numeric processor of the present invention is capable of handling integer word (16 bits) integer short 32 bits) and integer long (64 bits) representations as well as 18 digit signed BCD integers.

II. GENERAL INTRODUCTION TO THE SYSTEM CONTEXT OF THE NUMERIC PROCESSOR OF THE PRESENT INVENTION.

The numerical floating point processor of the present invention (hereinafter "the processor" or "FPU") is a high performance processor fabricated in an integrated circuit package and with standard circuit technology incorporating many features not available in any present day floating point processor. The processor of the present embodiment is intended to be used in a multimaster system as the arithmetical unit in support of a co-processing central processing unit (CPU). The processor thus becomes a software transparent extension of the CPU, thereby greatly improving system performance beyond that achievable through other alternatives. As described in a copending application entitled "Apparatus and Method for Cooperative and Concurrent Co-processing of Digital Information" filed June 30, 1978, Ser. No. 921,082 the processor is a concurrent, co-processing unit with its corresponding CPU. While the processor is executing a floating point instruction, its corresponding CPU continues with the instruction stream, thereby achieving overlapped operation with the processor. Program throughput is thereby increased by operational interleaving of the processor and CPU instructions. Floating point instructions are decoded directly from the CPU's instruction stream. When the floating point instruction is decoded from the instruction queue of the FPU and CPU, the floating point unit will execute that instruction in parallel with the CPU which continues with the instruction stream. If the CPU encounters a second floating point instruction, it will "mark time" until the processor has finished the first floating point instruction.

The bifurcated nature of the processor can be appreciated if the operation of the processor in conjunction with its CPU is briefly described. The FPU gains access to the local bus by means of a single request grant pin. The processor tracks the instruction queue of its corresponding CPU by monitoring the status inputs and tracking the data bus in parallel witl. :he CPU. When a floating point instruction is fetched from the instruction queue, CPU 20 will not execute it. In the case of a nonmemory instruction, the CPU 20 ignores it totally and proceeds with its other operations. In the case of an instruction with a memory reference, CPU 20 will calculate the effective address using its addressing modes, and will perform a dummy that is, a normal read except that CPU 20 will not e. r the data. Instead, FPU 22 of the present invention, will capture the address of the operand during the first clock cycle and the data during a subsequent clock cycle. In this manner, the processor CPU 20's addressing capabilities with respect to external memory. After a floating point instruction has been fetched, the FPU 22 can start execution unless it requires more pieces of data. In this latter case, the FPU will request the bus by the request/grant handshake and fetch the rest of the operand as though it were the central processor. CPU 20, itself, by incrementing the address captured from the bus to address the subsequent words of the operand. When FPU 22 needs to store the results in memory, it will be CPU 20 to indicate the starting address of the operand in memory. Again, it will request the buses and will write into memory, incrementing the address after every write. While FPU 2 is computing internally, CPU 20 has the buses and can proceed with whatever the program dictates. This is what is meant by co-processing between FPU 22 and CPU 20.

Occasionally, synchronization between CPU 20 and FPU 22 is required and CPU 20 must wait for FPU 22 to finish before a subsequent floating point instruction can be executed. A specific software instruction. WAIT, is provided in the instruction set to cause CPU 20 to wait at the appropriate times. Similarly, when FPU 22 desires to store information in memory, it must make certain that it stored in information before CPU 20 tried to read it. Again, this synchronization is provided by a software instruction which will cause CPU 20 to wait if FPU 22 has not yet performed the required operation.

Figure 2:
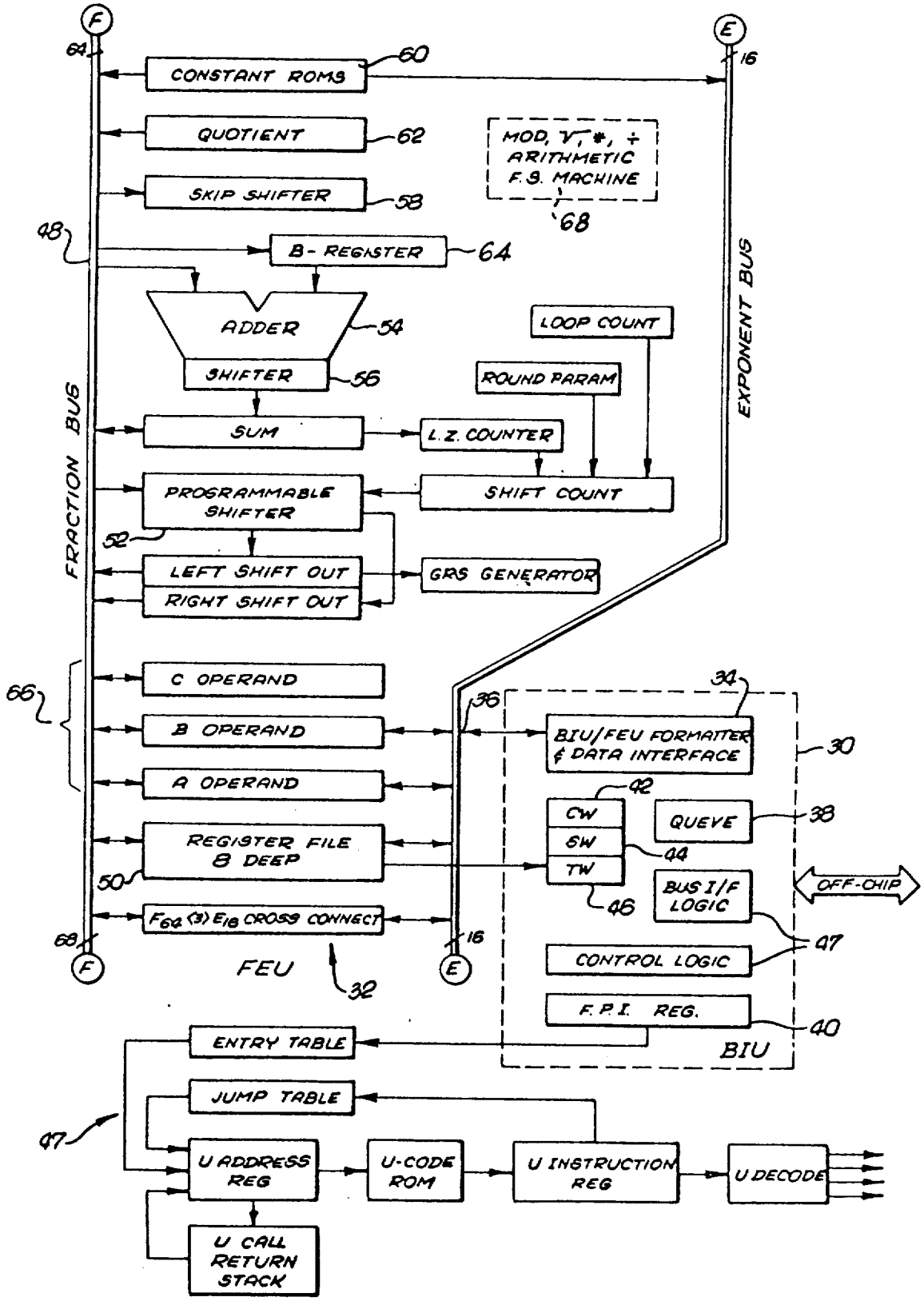
FIG. 2 is a simplified block diagram of the architecture of the numeric processor showing its division into a bus interface unit and floating point execution unit.

To accomplish this coprocessing FPU has a bus interface unit (BIU 30) shown in FIG. 2 which monitors and tracks the activities on the local bus and the status of CPU 20, and communicates with CPU 20, while the arithmetic operations are independently proceeding within the numerical processor's computation unit, floating point execution unit (FEU 32).

FIG. 1 diagramatically shows in simplified form a CPU 20 concurrently coprocessing information in a digital system with the processor of the present invention, floating point unit (FPU) 22. As diagramatically illustrated in FIG. 1, FPU 22 shares many of the external status and administrative function control pins with CPU 20. For example, FPU 22 and CPU 20 both operate from clock 24 and are coupled through a local bus 26 to a system bus 28 by the same set of latches 29, bus controllers 27 and transceivers 25. It is beyond the scope of the present invention to detail the exact nature and coordination within the local bus between CPU 20 and FPU 22, but details of this operation have been disclosed on copending applications, entitled "Apparatus and Method for Cooperative and Concurrent Coprocessing of Digital Information", filed June 30, 1978, Ser. No. 921,082; "System Bus Arbitration and Circuitry and Methodology", filed June 30, 1978, Ser. No. 921,083.

The increased capability and reliability of FPU 22, becomes apparent when considered in view of the system of FIG. 1 wherein the FPU is a concurrent and coprocessing unit. The number of exceptions, interrupts and software handling which are reduced and removed from the arithmetic operations of FPU 22 necessarily leaves the CPU 20 and the entire system free to productively processed with processing of instructions without being overburdened by or delayed by inadequate or faulty arithmetic execution.

FIG. 2 illustrates in simplified diagramtic form the basic internal architecture of FPU 22. FPU 22 includes a bus interface unit (BIU) 30 and a floating point execution unit (FEU) 32. BIU 30 and FEU 32 are interactive and operate in a substantially independent, albeit coordinated fashion. This bifurcated internal architecture FPU 22 allows BIU to continuously track the local system bus status while execution of a floating point instruction is concurrently in progress within FEU 32.

The function of BIU 30 is to track the local system bus, to decode floating point instructions, maintain status information and control the local bus when FPU 22 is transferring data. The bus handshake protocol between BIU 20 and CPU 20 as described in copending application. "System Bus Arbitration and Circuitry and Methodology" filed June 30, 1978, Ser. No. 921,083; and "Apparatus and Method for Cooperative and Concurrent Coprocessing of Digital Information", filed June 30, 1978, Ser. No. 921,083. BIU/FEU formatter and data interface unit 34 serves to handle the passing of commands, operands and status between BIU 30 and FEU 32.

CPU 20 and FPU 22 simultaneously maintain a queue of pre-fetched instructions. Therefore, FPU 22 will simultaneously decode a floating point instruction with CPU 20. Upon detection of a floating point instruction FPU 22 will gain control of the system bus and perform any memory read or write cycles required. A 20 bit data port 36 couples BIU 30 to local bus 26. Coupled to data port 36 are a six byte instruction queue 38, a twenty bit floating point instruction address register 40, a sixteen bit control register (CW)42, a sixteen bit status register (SW)44, and a sixteen bit tag register (TW)46. Additional logic registers and decoding circuitry 47 are also included within BIU 30, in a manner well-known to the art and as disclosed in the above referenced co-pending applications, to decode and provide the necessary adminstrative processing of instructions into and from FPU 22 with respect to the local bus.

Floating point execution unit 32 is characterized by an internal file format, eighty bits wide, diagramatically in FIG. 2 as a 64 bit fraction bus 48 and a 16 bit exponent shown bus 49 All numerical quantities are converted to this standard file length real number within FEU 32, namely to a numeric quantity with a fifteen bit biased exponent, a sign bit and a 63 bit fraction. All calculations on the fractions within FEU 32 are performed to 67 bits of accuracy and then rounded as provided by precision control settings as discussed below.

Coupled to fraction bus 48 is a file memory array comprising a register file 50, eight registers deep, a programmable shifter 52, a sticky bit detector and adder 54, a post or sum shifter 56, a skip shifter 58, a quotient register 62, a multiplexed B register 64 and a constant ROM 60 containing various constants used in calculations of transcendental approximations. In addition, a number of temporary register 66 are included as may be required in the mathemetical operation and processing. Random control logic 68 is also included to provide discrete control in response to microcoded instructions in a manner well-known to the art. Logic circuit 68 includes a microcode engine for decoding the instructions and includes a microcode ROM to store the microcode program. The microcode program is not described herein for the sake of brevity, bit can be derived from the definitions of the orthogonal instruction set.

Figure 8B:
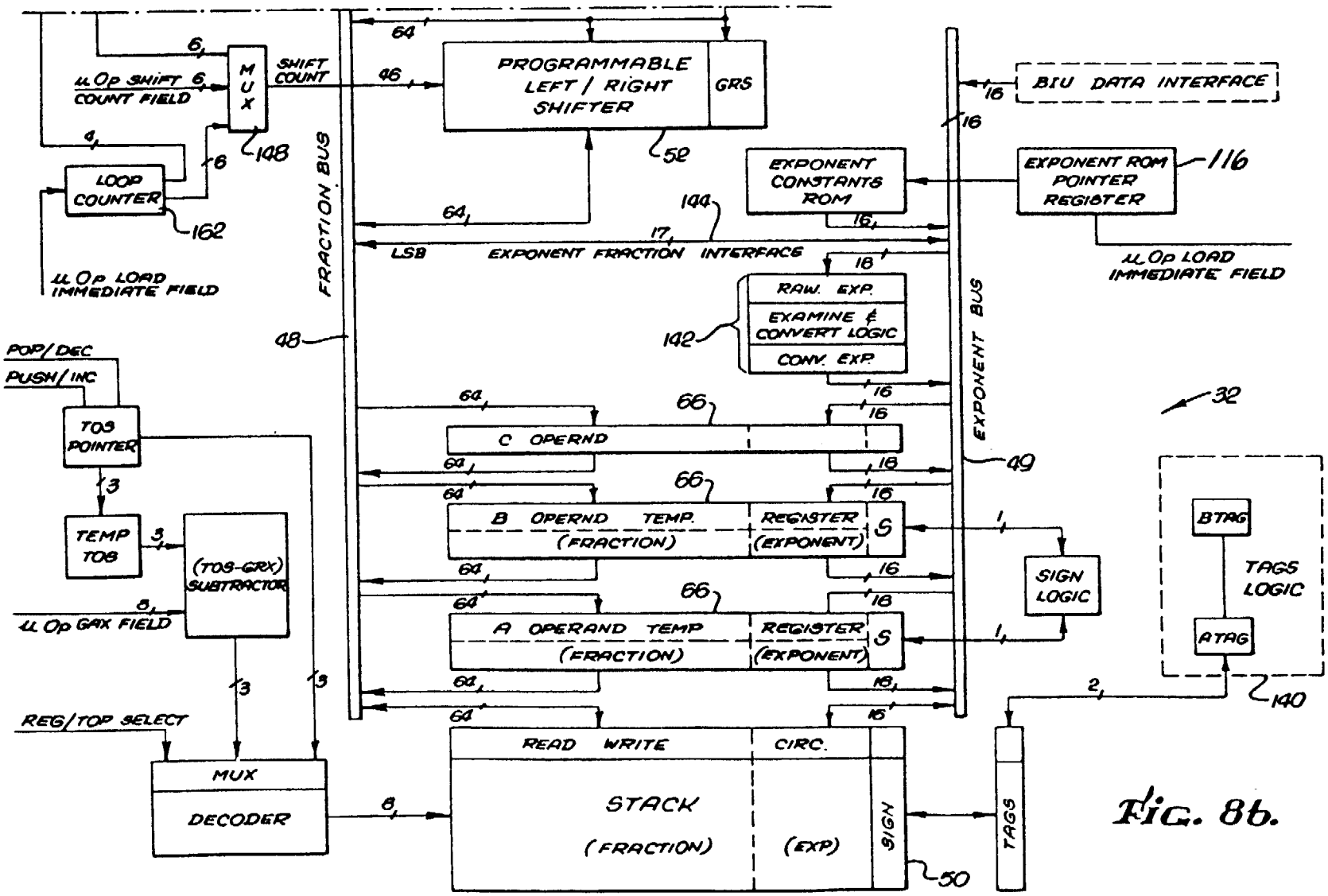

Consider the loading of numbers from memory into FEU 32 in greater detail as illustrated in FIGS. 8a and b. Data, for example, a 64 bit integer transferred by BIU 30 in 16 bit blocks in placed in one of the temporary registers 66 and then loaded into sum register 80. The next 16 bit block is also placed in a temporary register 66, but is shifted left by 16 bits in shifter 52 before being loaded into sum register 80. The remaining two 16 bit blocks are similarly loaded and shifted until the 64 bit integer has been assembled in sum register 80, which is still left with 16 leading zeroes. Normalization can now be implemented. Sum register 80 includes the following components. Eight 8-input nor gates included in sam register 80 have their inputs coupled to an internal sum register and have their outputs coupled to a first coding circuit which identifies how many of the bytes are all zero. If all eight bytes are all zero, a zero indicator is immediately activated. If a 0–7 bytes are zero, the number of all zero bytes is loaded in to leading zero counter 154. Counter 154 in turn is coupled to shift count register 146 whose output is coupled to multiplexer 148. The output of multiplexer 148 is used to control the number of shifts in programmable shifter 52, thereby setting up of the contents of sum register 80 to be shifted left by the number of all zero bytes. Similarly, a second coding circuit has its inputs coupled to the eight bit places of the highest order byte of register 80. A three bit field is similarly loaded onto counter 154, register 146 and multiplexer 148 to shift the contents of register 80 left by the remaining number of zero bit places in the leading byte. The number of byte and bit shifts stored in counter 154 is then coupled to exponent circuit 142 wherein a corrected exponent is generated. The normalized number representing the integer is then stored in file 50.

Consider the normalization of a 32 bit real number in file format. The 32 bit word from BIU is characterized as consisting of word 1 comprising the 16 least significant bits and word 2 comprising the 16 most significant bits. The value, 40, is loaded from an immediate microcode literal according to microcode control. Table 158 is coupled to count register 146, with the result that the shifted value for word 1 is stored in register 80. Word 2 is then placed in a register ASE, which then includes from left to right, the sign, the exponent and the seven most significant bits. Again, from an immediate microcode literal a left shift of the contents of ASE by 57 places followed by a right shift of one and a forced one being placed into the most significant bit position. The contents of register ASE is then merged into register 80 by addition yielding a normalized real number, with an explicit leading 1 bit in 80 bit file format. The exponent of the memory real is coupled via exponent bus 49 to exponent circuit 142 where it is tested or examined for the special case exceptions, and converted to file format exponent. The normalized fraction and file format exponent are then loaded into file 50.

Without detailing the operation, 18 digit BCD is also translated into 80 bit file format using a series of multiplications by 10 (addition of a single and triple left shift) using Horner's rule as an implementary algorithm.

Conversion from file format to a selected data type is implemented as follows: In the case of an integer, the maximum number of the exponent representable in the data format is read from exponent ROM 160 into exponent circuit 142. The difference, (d=max exponent-exponent), between the exponent of the number to be converted and the maximum number is generated under microcode control and examined by circuit 142. If d is less than zero, an overflow condition results and an error flag is generated. If d is equal to zero an overflow is indicated if the number to be converted is positive (by our convention), or if negative, an overflow is generated unless the fraction is 1.000 . . . 0 (again this the largest negative number representable). Otherwise, the number is considered valid. If d is greater than zero, then the fraction is shifted right by d places as a result of transfer of d from circuit 142, through line 144 to counter 146. The denormalized function is then rounded and ready to be sent out as an integer.

Conversion from file format real numbers to memory is similarly implemented by exponent examination in circuit 142 and rounding. The 64 bit number in register 80 is left shifted by a fixed number of places as determined by table 158. For example, a single precision number having a 23 bit significand is shifted 40 places left. A guard (G), round (R), and sticky (S) bit are calculated as described below from the remaining tail in register 80. The original number to be converted is copied from file 50 and then shifted right by 213 bits with the GRS bits appended to the right end. The most significant 1 bit in file format is suppressed. The fraction can then be rounded and stored in working register together with the converted exponent from circuit 142 for transfer through BIU 30 to the user in 16 bit segments.

In the case of BCD integers the file formatted number is divided by $10^{+18}$. If the quotient is less than one, then a quotient is denormalized by a number of bit places equal to the absolute value of the exponent of the quotient, and a loop is entered whereby each BCD digit is extracted by multiplying the quotient by ten and extracting the four most significant bits to form each BCD digit.

Operands received from an exterior memory are preformatted to sixteen bit word boundary and transferred on a real time bases to FEU 32 through BIU/FEU interface 34, FEU 32 uses programmable shifter 52 to position the 16 bit quantities at adder 54 such that successive additions form the fraction and exponent and set tags which identify the type of operand. Control of FEU 32 is provided by a microcode control engine or control logic 68, which receives its instructions from the registers in the BIU/FEU interface unit 34.

Once FEU 32 has performed the operations required by the floating point instructions, if transfers the information regarding execution and/or error conditions to status register 44 and tag register 46 from whence they are relayed to the user. As previously stated, BIU/FEU unit 34 passes commands, operands and status signals between BIU 30 and FEU 32. Upon entry into FPU 22, each portion of an operand is transferred through BIU 30 into a preformatter within the BIU/FEU interface unit 34, and then transferred to FEU 32. Once the FEU 32 the operand is checked for validity and repacked into the file format in which all operations are calculated. The preformatter in BIU/FEU unit 34 allows the repacking to be a succession of FEU unit additions such that the operand can be transferred using back-to-back memory cycles. One of the primary objects of BIU/-FEU unit 34 is to allow the numeric processor to interface with both word and byte users which present information on both even and odd memory addresses. Circuitry adapted to provide this type of service is described in the co-pending applications entitled, "Apparatus and Method for Providing Byte and Word Compatible Information Transfers," Ser. No. 910,103, filed May 30, 1978. In any case, information is uniformaly provided to FEU 32 by unit 34 as two byte words.

III. ARITHMETIC OPERATIONS OF THE NUMERIC PROCESSOR

The arithmetic heart of FEU 22 is centered about a nanomachine comprised of adder 54 and its related registers, shifters and control circuitry. The nanomachine is particularly characterized by its ability to handle higher order arithmetic calculations directly in hardware in file format at high rates of speed.

Figure 3:
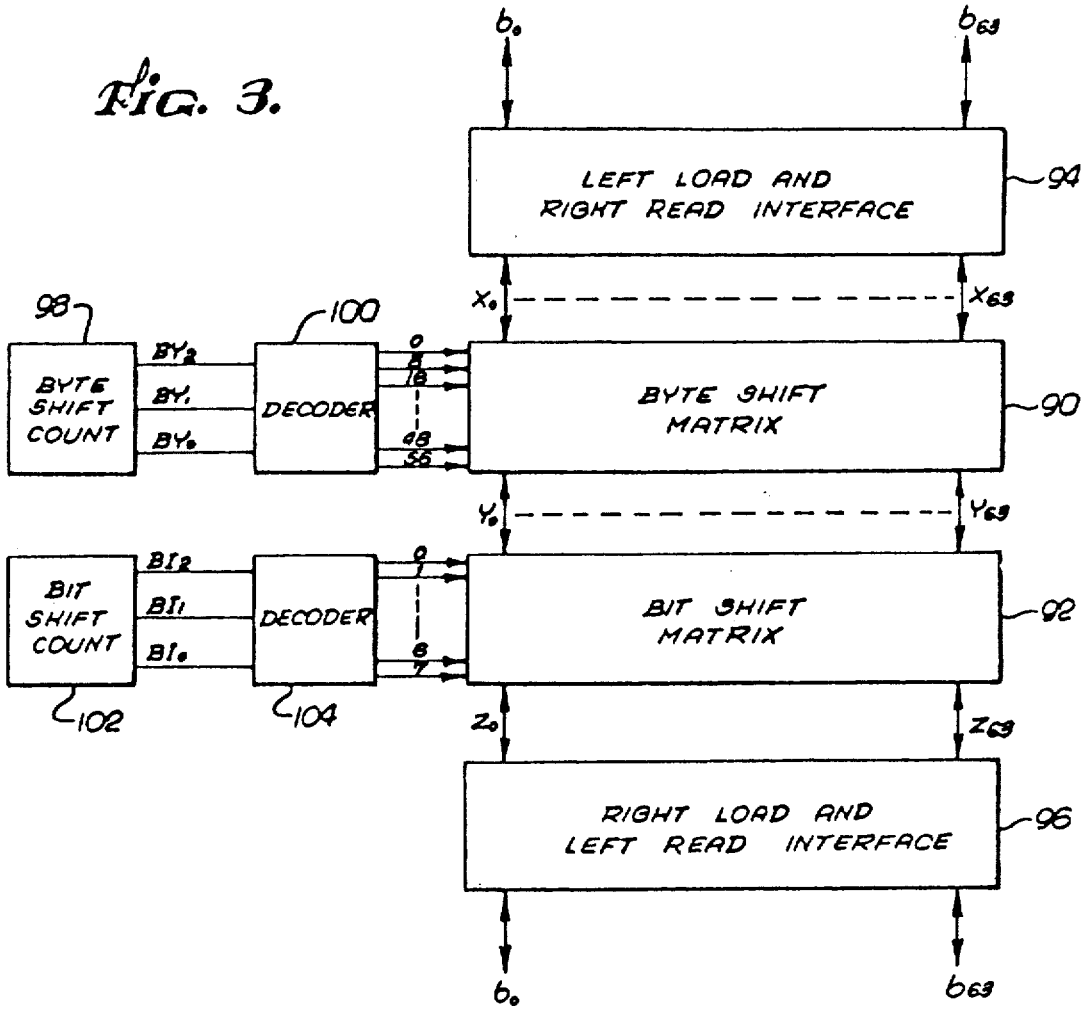
FIG. 3 is a block diagram of a programmable shifter included within the present invention wherein left and right shifts of an arbitrary length may be made within a single clock cycle.

The nanomachine is shown in FIG. 3 and can be better understood by considering the operational routines used in the present invention for multiplications, division, square root and modulus arithmetic.

A. MULTIPLICATION

Consider first the multiplication routine. In the presently illustrated embodiment, two bits are manipulated in parallel during each clock cycle.

The multiplier is loaded into skip shifter 58 according to program control well-known to the art. Skip shifter 58 is a conventional bidirectional shift register which in the multiplication routine, shifts its contents two places to the right on each clock cycle in response to control from from control circuitry 70 as shown in FIG. 7. The two right most bits are used to indicate the current multiplier control code. Skip shifter 58 is coupled to control circuit 70 which is comprised of random logic designed according to principles well-known to the art in conformity with the teachings of the present invention. A balance flip-flop in multiplexer control 70 is used in order to avoid three bit additions. Table 1 below summarizes the operation of control circuitry 70 as a function of the bit pair multiplier and the balance of the balance flip-flop within control circuit 70.

TABLE 1

| b1 | b0 | Old Balance | Mux Control | New Balance |
|---|---|---|---|---|
| 0 | 0 | 0 | 0B | 0 |
| 0 | 0 | 1 | 1B | 0 |
| 0 | 1 | 0 | 1B | 0 |
| 0 | 1 | 1 | 2B | 0 |
| 1 | 0 | 0 | 2B | 0 |
| 1 | 0 | 1 | −B | 1 |
| 1 | 1 | 0 | −B | 1 |
| 1 | 1 | 1 | 0B | 1 |

The multiplicand is loaded into B register 72 according to program control from the internal 64 bit fraction bus 48. The output of B register 72 is controlled by mutliplexer 74 which in turn is controlled by control circuitry 70. Multiplexer 74 coupled its output to one side of adder 54 while the other side of adder 54 is coupled to bus 48. The output of adder 54 is coupled to sum shifter 76, and is selectively controlled by machine control circuitry 78 shown in FIG. 7. The output of sum shifter 76 is coupled to a master-slave register 80.

Consider the operation of circuitry of FIG. 7 as described in connection with Table 1. In the case where the previous balance of the balance flip-flop of circuit 70 is zero, the contents of B register 72 is set to zero, coupled directly through or shifted left one bit position, depending upon whether the multiplier, $b_0b_1$, is 00,01 or 10 respectively. In the case where the old balance is zero and the multiplier is 11, the contents of the B register 72 are complemented and the balance flip-flop is set, otherwise the balance flip-flop remains reset as shown in Table 1. In those cases where the prior value of the balance flip-flop is 1, namely, where the balance flip-flop is set at the beginning of the cycle, the contents of B register 72 are coupled to the right side of adder 54, either without shifting, with a left shift, complemented or set to zero, depending upon whether the multiplier is 00, 01, 10 or 11 respectively. Again, as shown in Table 1 in the case where the old balance is 1 and the multiplier is either 10 or 11, the balance flip-flop will remain set, otherwise it will be reset. The metholodogy which is illustrated in Table 1 uses zero multiplication or simple left shifts in order to multiply with the factors 0,1 or 2. When multiplication by three is required what actually occurs is a multiplication by four by a two bit left shift combined with a twos complement subtraction. During the mutliplication process, the output of adder 54 is automatically shifted right two locations within sum shifter 76 by virtue of shift count control from circuit 78. The right most bits during the multiplication process go into the GRS bits and are used for rounding as described below. The sum of slave register 84 is then used as the input to the left side of adder 54.

For example, consider the multiplication of the numbers 1111 and 1010 or in decimal equivalent, $15\times10$. Although, in the normal course of operation within the present invention, the numbers will usually be normalized, the principles illustrated by the example are the same whether the numbers are normalized or denormalized. The multiplier, 1111, is inserted into skip shifter 58. The multiplicand 1010, is loaded into B register 72. The first pair of digits is shifted out of skip shifter 58 to control circuit 78, which according to the logic illustrated in Table 1, causes the complement of B register 72 to be coupled through multiplexer 74 to the right side of adder 54. The complement of the register is required for the subtraction operation which is implemented in adder 54 which is coupled to sum shifter 76 as −1010, since the right side of adder 54 was initialized to zero by the clearing of sum register 50. Shift register 76 will shift −1010 two places to the right to leave the partial product −001010. The balance flip-flop is set and the next pair of digits in skip shifter 58 are coupled to control circuit 70. Again, the digits 11 with a prior balance flip-flop of 1 causes a zero to be coupled through multiplexer 74 to the right side of adder 54 with the balance flip-flop remaining set. The sum is again shifted right two digits in sum shift register 76, leaving the partial product −00001010 in sum register 80. The partial product is then coupled to the left side of adder 54 and the next pair of digits, which are 00, is coupled into control circuit 70. As set forth in Table 1, the multiplier pair 00 with a prior balance of 1 results in the contents of B register 72 being coupled through multiplexer 74 to the right side of adder 84 and added to the last partial product. The result is 1010–00001010 or 10010110 which is the final product, the binary equivalent of the decimal number, 130. The above example has been described in signed negative notation while the computation is actually implemented in twos complement. The signed negative has been used in the example, only for the purposes of clarity.

B. DIVISION

A non-restoring method is implemented in the circuitry of FIG. 7 to perform division by machine hardware. The divisor is loaded according to program control into B register 72 while the dividend is similarly loaded in sum register 80. A series of addition and subtraction steps are then carried out within adder 54 as determined by the sign of the former operation. In other words, the contents of B register 72, are added or subtracted to the contents of sum register 80 to create a new sum according to the sign of the former operation. The value of the sign in each operation is inverted by inverter 86 and coupled into quotient register 62. In other words, if the sign of the sum was positive, the next operation will be a subtraction. Conversely, if the sign of the sum is negative, the following operation will be an addition. Thus, bit by bit the quotient is assembled in register 62.

Consider the example wherein 150 is divided by 15. Division is performed with both operands in normalized format. Therefore, the contents of sum register 80 is coupled to the left side of adder 54 as 10011 0110 representing 150 while the right side of adder 54 is loaded with −1111 0000 representing 15. The results of this subtraction is −101 1110 which is coupled into sum shift register 76 and is shifted left one bit position by virtue of shift count control from circuit 78. The contents of register 80 is thus −1011. Inasmuch as the result is negative, a zero is loaded into quotient shift register 62 and the contents of register 72 is then added into the contents of register 80 in the next cycle in adder 54. The result in sum shift register 76 after being shifted left one space to 0111 1000. Since the result is positive, a binary 1 is loaded into shift register 62 by taking the sign from sum shift register 76 and inverting it through circuitry 86. Similarly, the next shifted sum in register 76 will be −1111 0000, thereby loading a zero into register 62. On the next cycle, a positive zero is the sum in register 76 resulting in a positive 1 shifted into the right bit position in register 62. In each succeeding cycle, a 0 will be shifted in. The result in register 62 will be the number 1010. Placement of the decimal is provided by exponent control described below. Again the above illustration is for purposes of example only, and it is contemplated that it could be replaced by an equivalent two's complement, non-restoring algorithm.

C. MODULUS ARITHMETIC

Modulus arithmetic is performed in a circuitry of FIG. 7 in manner identical to division as described above with the exception that the number of cycles is determined by the exponent difference in the two numbers. The remainder appears in register 80. For example, consider the operation of 10 modulo 8. 1010 is initially loaded into register 80 while 1000 is loaded into register 72. Both numbers have the same exponent, therefore according to machine control, a single cycle is performed. According to the division routine described above, the contents of the B register 72 is subtracted from the contents of sum register 80 in adder 54 leaving the remainder, 10 in sum shift register 76. The remainder 10, is then coupled to to sum register 80, and since the exponents are equal, the modulus arithmetic operation is completed in a single cycle and presented to bus 48.

D. SQUARE ROOT

The circuitry of FIG. 7 also performs square root operations in hardware according to a nonrestoring method wherein the argument is loaded into skip shifter 58. B register 72 and sum register 80 are initially cleared. The root will be coupled into B register 72 during the arithmetic operation and will be shifted from right to left one bit at a time from the sign bit coupled from circuitry 86. On every cycle, two bits are taken from the left end of slip shifter 58 and appended to the right end of the partial remainder at the left input of adder 54. The bit pair,11, is appended during each such shift to the right input of the partial root which is formed in B register 72. These operations are controlled by random logic well-known to the art which is selectively activated according to the teachings of the present invention. An addition or subtraction then takes place within adder 54. The sign of the former remainder will determine whether or not the current partial root will be complemented in the case that the sign of the former remainder is positive, or left uncomplemented. The sum from adder 54 is shifted two bit locations to the left in sum shift register 76, in response to the shift count control from circuitry 78. At the end of the operation, the total root will be contained in B register 72.

Consider, for example, the square root of 25. The argument 011001 is loaded into slip shifter 58 while B register 72 and sum register 80 are cleared. The left input of adder 54 is set equal to 000 0000.01. The sign bit is replicated for two or three places in adder 54. Since the sign of the form sum zero (0=positive) was positive, the contents of register 72 will be complemented and 111 1111.11 will be inserted into the right input of adder 54. The sum is zero, since the carry is lost and the sign of the sum is again positive. The contents of B register 72 will now be 0001 due to the complemented sign from inverter 86. The next input to the left side of adder 54 is 000 0000.10. The right input will be 111 1110.11, since the former sum was shifted left two places by shifter 76. The next sum is 111 1111.01 or negative. B register 72 then becomes 0010 and the shifted sum register is −1101. Finally, the next left input to adder 54 is 111101.01 while 000 0010.11 is at the right input. The new sum is a positive zero, since the result is exact, and the root appears in B register 72 as 0101 or 5.

E. ROUNDING APPARATUS AND METHODOLOGY

FIG. 7 illustrates the arithmetical operational portion of FEU 32 and in particular, the rounding circuitry of the present invention. The rounding methodology employed in the present invention is comprised of two steps: Firstly, the step of generating the sum and three rounding bits; and, secondly, performing the rounding operation specified. The rounding bits are denoted as the guard (G) round (R), and sticky (S) bits.

Ultimately, all arithmetical operations are reduced at one point to a binary addition. In FIG. 7, binary adder 54 which is a 64 bit wide adder, operating at approximately 5 megahertz, has its output coupled to sum shifter 76. The output of sum shifter 76 is coupled to a master-slave register 80 which includes as its three least significant bits, the GRS bits.

The detailed formation of the sum and the GRS bits in the first step of the method will vary depending on the type of arithmetical operation to be executed. Consider, for example, the addition and subtraction operation. Consider the addition of two normalized operands with different size exponents, such as $1.0101\times2^2$ and $1.0011\times2^6$. The smaller operand is denormalized to 0.0001, $0101\times2^6$. In our example, we have limited the length of the word to four binary places for simplicity of illustration. In the illustrated embodiment, the standard word length is set at 64 bits. The "tail" of the denormalized number are the bits "0101". The values of the guard, round and stocky bits are then set by the value of this tail. The most significant bit of the tail becomes the guard bit, the next bit of the tail becomes the round bit; and the logical-or function of all the remaining bits of the tail become the sticky bit. Therefore, the GRS bits of the denormalized number in the example are "011" respectively. The desired arithmetical operation is then performed. In FIG. 7, adder 54 is shown as having an input for the normalized operand on its left input and an input for the denormalized operand on its right input. Thus, in the illustrated embodiment the both inputs of adder 54 are 64 bits wide. The output of adder 54 is 69 bits wide to accommodate the GRS bits and carries.

In the second step of the method, the selected operation is then performed. In the above example, the sum is $1.01000011 \times 2^6$. In case of addition, the sum is shifted directly through sum shifter 76 and coupled to master-slave register 80 which is usually cleared previous to the arithmetic operation. In the rounding operation, a determination is made whether or not to add a binary one to the least significant bit of the fraction of the result. This 1 will be added to the least significant bit of the result of the arithmetic operation according to program control, depending on whether or not a control logic signal, yielding a status bit "A", is set. Before or during the rounding operation, the "A" status bit will be set in the status register as will the "P" error bit, which is the logical-or function of the guard, round and sticky bits of the arithmetical result. The "A" status bit is generated by well-known random logic, according to the rounding mode selected under program control. Rounding mode is captured in an "RC" field, which is comprised of a two bit code for the rounding modes: "nearest", "up", "down", and "chop". In the chop mode "A" is simply set to 0 with the result that a binary 1 is never added to the least significant bit of the arithmetical result. The result is merely chopped or truncated. In the simplified numeric example the result becomes $1.01000 \times 2^6$.

In the "down" rounding mode, "A" is set equal to the logical product of the "P" status bit and the sign of the arithmetic result. "P" or the logical-or function of the GRS bits is 1, thereby indicating that there has been a rounding error if any of these bits are 1. IF the result is exact, "P" will be zero. Thus, a 1 is added to the least significant bit of the result depending on whether or not the result is positive or negative. In either case, a 1 is added so that, if there is a rounding error, the rounded result will be closer to or rounded down towards minus infinity.

Similarly, in the "up" rounding mode, "A" is set equal to the logical product of the "P" status bit and the complement of the sign of the result. In this mode, the result will be rounded, where there is a rounding error towards plus infinity.

Finally, in the "nearest" rounding mode, "A" will be set equal to the logical product of the guard bit, "G", with the logical sum of the round, sticky and least significant bit of the result. In our numeric example, the exact sum lies somewhat between the machine representable number 1.0100 and 1.0101. The number which lies exactly between the two machine representable numbers is 1.01001. Therefore, if the guard bit is zero, the arithmetic result must lie nearer to 1.0100. The "A" status bit will thus be set to zero and the result rounded down to 1.0100. However, if the guard bit and either the round or the sticky bits are non zero, then the exact result must be greater than 1.01001, the "A" status bit will be set to 1, and the result will be rounded up to the nearest representable number, 1.0101. In the case where the guard bit is 1 and the round and sticky bits are both zero, the result stored within master-slave register 80 is exact, but is exactly half way between two machine representable numbers. In this instance, the least significant bit of the arithmetic result is examined, and a status bit "sum 63" is set according to program control, depending on whether or not the user desires to round to the nearest odd or to the nearest even number in such circumstances.

The entire rounding operation has been described in the context of addition or subtraction. The operations of multiplication and division are similar, but differ in the details of their execution in the first step of the method. For example, in multiplication, the two least significant bits from adder 54 are shifted right by sum shifter 76 by two binary places into the guard and round bit places in master-slave register 80. The sticky bit is the logical-or function of the guard and round bits during previous clock cycles. Thus, the guard, round and sticky bits in slave register 84 are combined in Or gate 88 to become the new sticky bit in master register 82. The sticky bit in slave register 84 is similarly the or-function of all previous guard and round bits in the mutliplication process.

similarly, in a division operation the entire quotient is assembled into shift register 62 and is followed by two additional division steps being performed on the remainder. The remainder quotient bits are shifted into the guard and round bit positions and the total remainder examined for any non zero bits. The sticky bit is set if the remainder sum is nonzero.

In the case of multiplication or division, the first step is then followed by a rounding operation which is complemented in exactly the same manner as described above in connection with addition and subtraction.

According to the present invention rounding is systematically incorporated into FEU 32. Fraction bus 48 is 68 bits wide, namely 64 bits of significand, one overflow bit and the three GRS bits, so that rounding information is always associated with the number. Shifter 52 includes random logic, including that described in connection with register 80, that shifts a number left the appropriate number of bits according to data format to isolate and identify the rounding information and to compute the GRS bits. Microcode is included within FEU 32 to select the appropriate shift number from table 158, and store it in shift count register 126 to selectively control shifter 52 to generate the appropriate GRS bits. The GRS bits are automatically retained and calculated in the nanomachine as described above.

F. Programmable Shifter

The operation of FEU 32 requires various unique circuits described below in detail.

Programmable shifter 52 of the present invention is included within FEU 32 to provide left or right shifts in the range of 0–63 bits in one clock cycle. Generally, this type of shifting is required in data format conversions, cordic approximations and denormalization operations. Left and right shifts are achieved by a bidirectional byte shift matrix 90 and a bidirectional bit shift matrix 92 diagramatically shown in FIG. 3. The number of shifts required is decoded into the number of whole bytes and fractional bits constituting the total required number of shifts.

For example, in FIG. 3 a shift of 52 bits would include 6 byte shifts and 4 additional bit shifts. The word is loaded from FEU bus 48 either into a left or right latch 94 or 96 respectively as required and then first shifted by the fractional number of bits or the required number of bytes, depending on whether the shift indicated is a left or right shift. For example, FIG. 3 shows a left load and right read interface circuit 94 which serves both as the input for left loads and the output for right shifts. Similarly, a right load and left interface circuit 96 is provided as a right input circuit and a left shift output circuit. A byte shift count register 98 and decoder 100 drives byte shift matrix 90 while a similar bit shift count register 102 and decoder 104 drives the bit shift matrix 92. Both registers 98 and 102 are three bits wide and drive similar shift matrices 92 and 90. Byte shift register 98 is decoded by decoder 100 to drive byte shift command lines labeled 0, 8, 16, 32 . . . 48, and 56. Similarly, bit decoder 104 has as its output eight discrete lines labeled as 0, 1, 2, . . . 6, and 7.

Figure 4:
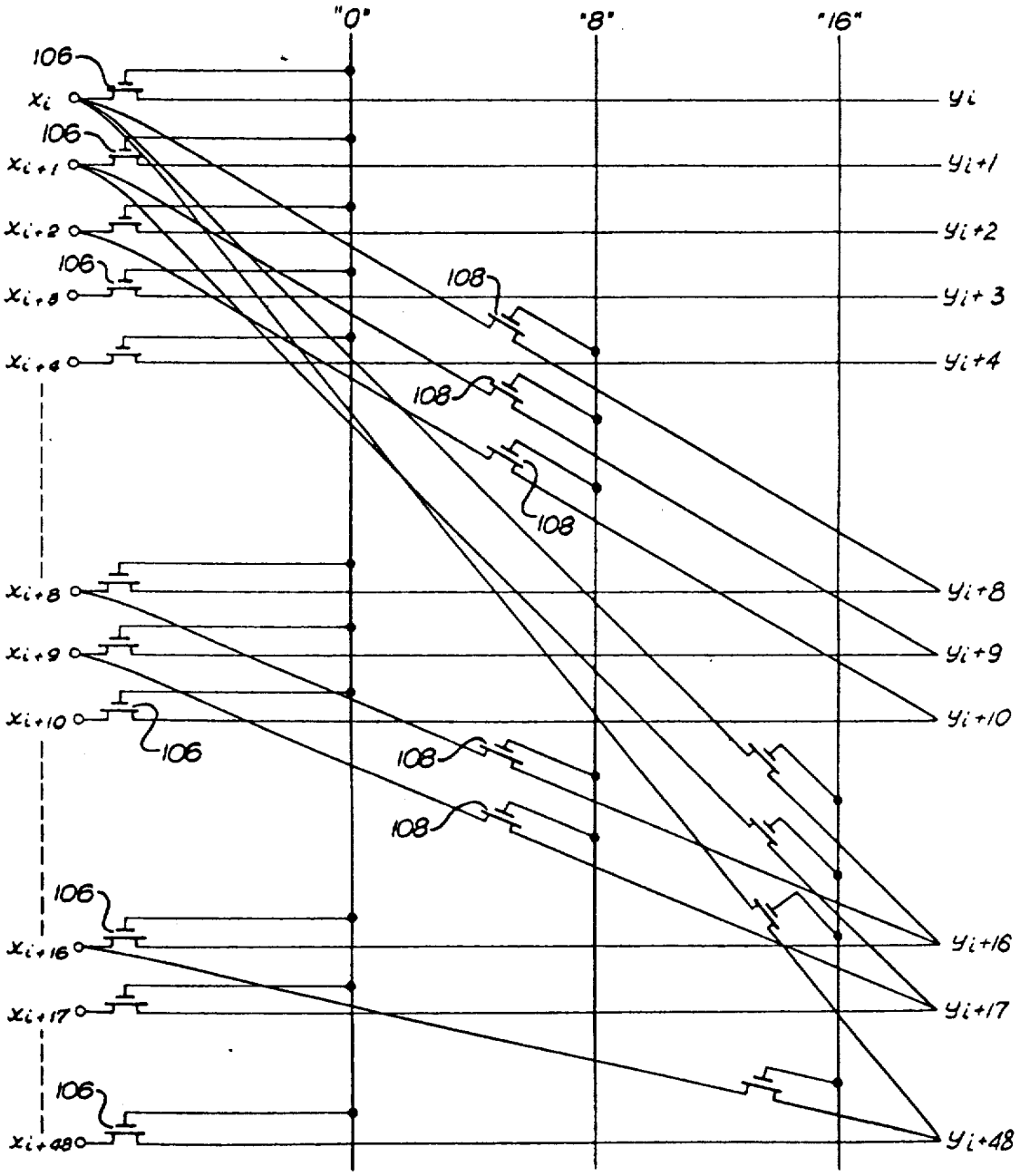
FIG. 4 illustrates the byte matrix shifter portion of the programmable shifter illustrated in FIG. 3.

FIG. 4 diagramatically illustrates byte shift matrix 90 and bit shift matrix 92. Only byte shift matrix 90 will be illustrated for clarity, but bit shift matrix 92 is analogously constituted. The devices illustrated are bidirectional integrated circuit devices, and for the sake of simplicity, the left hand nodes, $X_i$ shall be considered the input while the right hand nodes, $Y_i$ shall be considered the output, although the matrix is totally symmetrical and the opposite could also be true. In the illustrated example, activation of the "0" decode line from decoder 100 activates bidirectional devices 106 which allows the signal on nodes $X_i$ to be transferred directly across to nodes $Y_i$, thereby representing a zero shift. However, if the decode line "8" is activated, bidirectional devices 108 are each activated, thereby coupling node $X_i$ to node $Y_i+8$. Similarly, discrete decode line "16" will cause node $X_i$ to be coupled to node $Y_i+16$ and so forth.

In the same manner, discrete control lines 0, 1, 2 . . . from decoder 104 will cause shift devices similar to those shown in FIG. 4 to cross-couple node $X_i$ to node $Y_i+1$ in case of activation of control line "1" and $X_1$ to $X_i+2$ in the case of control line "2" and so forth.

Both byte and bit matrix are precharged and are considered in the present embodiment as being in an active low logic condition. Therefore, when a number is shifted to the left the vacated right bit positions will not be coupled to the data source. Thus, the precharged state of the byte or bit matrix will be read as logical zeros. Similarly, zeros will be filled in the most significant bit positions in a right shift.

Figure 5:
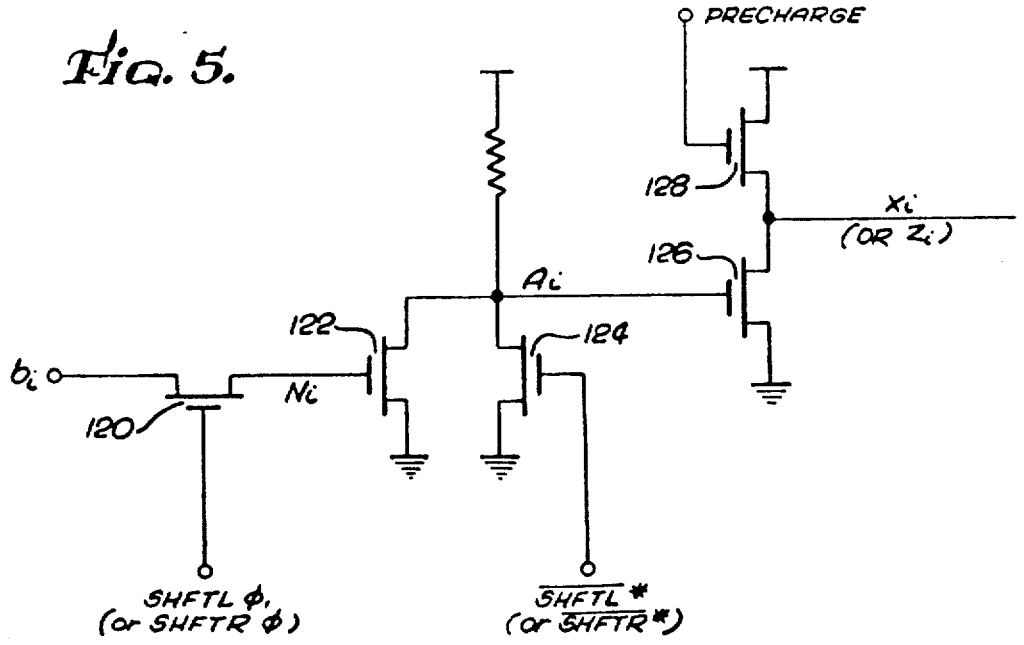
FIG. 5 is a schematic diagram of a load interface unit circuit used in the programmable shifter.

The read and load circuitry can be understood by considering in detail the circuitry of the bidirectional right and left read interfaces 94 and 96. FIG. 5 illustrates a typical unit circuit used as a load interface. A data bit $b_i$, is coupled as an input to a bidirectional device 120 whose gate is controlled by the logical product of a left or right shift command signal and a timing clock, $_{-1}$. If a shift is required, device 120 will go active on clock $_{-1}$, charging node $N^i$, which is the gate of device 122, to either a logical zero or 1, depending upon whether the data bit, bi, is 1 or 0. At a slightly delayed time, the delayed right or left signal coupled to the gate of device 124 will go active low thereby allowing node $A_i$, to go high if node $N_i$ is 0 or will pull node $A_i$ low if node $N_i$ is 1. The gate of transistor 126 is controlled by the condition at node $A_i$ and will, together with device 128, provide an inverted output X, with respect to $A_i$. In other words, $X_i$ will be pulled low in the case that $b_i$ is low or will be left precharged by device 128 if $b_i$ is one.

FIG. 6 similarly illustrates a typical unit read interface circuit. The input is Zi from bit or byte matrix 90 or 92 is coupled to the input of transistor 130 whose gate is controlled by a delayed shift left or shift right signal. The signal present at Zi is coupled to the input of inverter circuit 132 whose output is coupled to inverter circuit 134. The output of inverter circuit 134 in turn has its output fed back to the input of inverter 132 to form a feedback loop which is completed by the complement of the shift left or shift right signal through feedback device 133. The output of the first inverter stage 132 is coupled to the gate of device 136 which has an input coupled to ground and its output coupled to the bus node $b_i$. Device 136 is coupled to node $b_i$ through device 138 whose gate is controlled either by the read shift left or read shift right signal. Since the bus is precharged, the 1 on $Z_i$ is coupled as a 0 to the gate of device 136 which allows $b_i$ to remain in its precharged, logical high state. Otherwise, if $Z_i$ is 0 device 136 is conductive thereby pulling $b_i$ to ground as well. The output $Z_i$ is latched by the inverter combination of devices 132 and 134.

IV. ARCHITECTURE AND ORGANIZATION OF THE FLOATING POINT EXECUTION UNIT

A. General Discussion

The present invention incorporates a number of unique protocols in respect to denormalization and normalization of exponent numbers, zero and infinity arithmetic, and error detection and handling. Before describing these protocols in detail, the internal file organization of FEU 32 should be understood. An internal register file 50, illustrated in FIGS. 2 and 3, is treated both as a stack and general register file. The current stack top in file 50 is identified by a "top" field in status work register 44 in BIU 30. A two bit field in the "tag" field of tag word register 46 identifies whether each register is empty or contains an operand. Register file 50 is addressable as ordinary registers by an addressing protocol which is relative to the designated top register (TOS). The register address is computed at the start of each floating point instruction and is computed by adding the address of the top of stack register to the register displacement field within the floating point instruction. Thus, "top" plus zero is the top of stack, "top" plus one is the next on the stack, and "top" plus seven is the bottom of the stack.

Consider first the organization of tag word register 46. Register 46 is 16 bits wide and is grouped into two bit fields to comprise upper and lower byte of four fields each. In the illustrated embodiment, the tag codes are 00 for valid; 01 for zero; 10 for invalid or infinity; and 11 for empty. The tags are primarily used to facilitate branching and inspection within the microcodes employed in FEU 32 according to well-known design principles.

Status word register 44 is similarly a 16 bit register which holds the current status of the entire chip. The upper byte is used for conditional branching while the lower byte holds error information and is used for error recovery. The upper byte is comprised of eight status bits including a three bit pointer to the top of stack register. One bit, the busy bit, is used to indicate that FEU 32 is busy, while the remaining four status bits assume various meanings according to the coding devised for various floating point instructions. The lower byte of status word register 44 includes a number of error and exception flags, such as an interrupt bit, N, which signifies a request for an interrupt routine; a precision error bit, P; and underflow error bit, U; an overflow error bit, O; a divide by zero error bit, Q; a denormalization error bit, D; and an invalid error bit, I.

Finally, control word register 42 similarly is comprised of two upper and lower bytes. Each of the bit locations represents a field or bit flag which can be set according to program control and utilized during operation to effect a control function. For example, in the upper byte, control word register 42 includes an affine closure flag for infinity arithmetic, and the rounding control two bit field (RC) used to control the mode of rounding as described above. A two bit precision field PRE, in the upper byte, specifies the precision required in the result and thus the format to which the result will be rounded. For example, the code 00 indicates a precision of 24 bits which is analogous to real single representation; the code 10, a precision of 53 bits and analogous to real double representation; and the code 11, requiring 64 bits analogous to integer long representation. The lower byte of control word register 42 includes a plurality of mask bits, such as a common mask bit, M, which masks the N bit in status word register 44, thereby preventing the initiation of an interrupt routine. The remaining mask bit locations are used to mask relevant error bits and correspond to the errors represented in the lower byte of status word register 44, there is a precision mask error bit, MP, corresponds to precision error flag, P; an underflow error mask MU, corresponding to underflow error flag U; an overflow error mask, MO, corresponding to overflow error, O; a divide by zero error mask, MQ, corresponding to divide by zero error flag, Q; a denormalization error mask, MD, corresponding to denormalization error, D; and an invalid error mask, MI, corresponding to invalid error flag, I.

The manner in which data is manipulated and precision controlled within the present invention can now be summarized. All operations in the chip are performed using the file floating point format which is an 80 bit real representation. However, when the result of an arithmetic operation is exact, such as when two integer operands are involved, the result is effectively an integer. The file format of the present invention is an 80 bit number wherein 64 of the bits are dedicated to the fraction and 16 are dedicated to the sign and exponent. In arithmetic operation where an operand must be denormalized includes a guard and round bit to extend the normal 64 bit fraction. If there are any one bits beyond the 67 working bits, a third bit, the sticky bit as described above, is set in the sticky bit register coupled to the output of the adder. Normally, in the default rounding mode, the results are rounded to the nearest representable floating point number and in the case that the result is exactly between two representable values, it will be rounded to the nearest even number. However, as described above, the RC bit field in control word register 42 allows for a chop and directed rounding, namely rounding up or down, according to program control. The precision control field, PRE, will determine the precision to which the result of the mathematical operation will be rounded, that is, PRE is 00 for 24 bit sign and magnitude fraction, 10 for 53 bit sign to magnitude fraction, and 11 for a 64 bit integer or file format fraction.

Overflow and underflow errors are suppressed during directed rounding, if masked. Should either type of error occur during an instruction, the error indication is suppressed only after the proper masked response has been made. An error is not reported by setting the appropriate bit of status word register 44, but is handled appropriately.

B. Handling of Denormalized and Unnormalized Numbers

The present invention allows the generation and handling of unnormalized numbers. An unnormalized number is defined as a valid number where the fraction is not normalized, that is, the leading or hidden bit is not 1 Unnormalized numbers may be generated internally due to a result that is too small to be represented in normalized form. For example, a number may have a small exponent which can be incremented to become representable. In order to compensate for the incrementation of the exponent, the fraction will be shifted right by as many bit places as is required to increase the exponent. The result could be an all zero fraction (defined as a "pseudo-zero"). Unnormalized numbers can also be created in the operation of storing numbers into memory.

In file 50 two kinds of unnormalized numbers may exist, namely, a valid number where the fraction is unnormalized where the fraction, but not the exponent may consist of all zeros (pseudo-zero); and an invalid number with an exponent equal to zero and a nonzero fraction. This latter type of number may be generated on a masked underflow as a result of the computation. In any case where an unnormalized number is detected, a flag will be set. Generally, unnormalized numbers are restricted to their own domain as long as they have significance. For example, in the case of addition, where larger number is denormalized, then the result is left in a denormalized format. This is implemented by setting the D flag and branching by microcode to omit the normalization routine. In the case of subtraction, if the number of greater magnitude is denormalized, a specific response must be made depending on the circumstances of the operation as to whether normalization should occur. Thus, regardless of whether the operation is one of addition or subtraction, if the number of greater magnitude is denormalized, the result would be denormalized as well. Otherwise, the result is normalized. In the case of multiplication, the result is always left in the denormalized format. In the case of division, if the denormalized number is in the divisor, an error is flagged, or, if in the dividend, the result is left in the denormalized form. Finally, in the case of the square root, if the argument is denormalized, an error flag will be generated as in division, since in neither operation can be nanomachine return a correct result with an unnormalized operand.

Arithmetic manipulation of denormalized numbers may also require special handling in certain circumstances as summarized in Table 2 in the appendix.

C. Signed Zero and Infinity Generation and Handling

Signed zeros and infinity are detected and handled as exceptions or errors and, according to the present invention, and are tagged in each case with a specific response returned if the exception or error is masked.

Both plus and minus zero is represented in the real single and double precision representations, including memory and file formats, in the present invention. Similarly, positive zero is represented in integer representation and signed zero in BCD representation.

During arithmetic operation and various transfer operations, the handling of true zeros, pseudo-zeros and infinity is calculated and, in each case, is handled as a tagged error or quantity which will generate an interrupt, unless masked, in which case the most logical or expected result is returned. If, before an operation is performed the tags of the operands are checked in tag logic circuit 140 and if one or both of the operands are not valid or nonzero, then a special routine, is invoked according to conventional microcode control.

If plus infinity is in the top of stack (TOP) and the other operand is minus infinity, then their sum is the non-number, indefinite, IND. Similarly, if top of stack is indicated as having a positive infinity and the operand is also indicated as having a positive infinity, the result will be indefinite (IND) and an error flag, the I error, will be set. If TOP is minus infinity and plus infinity is subtracted as an operand, the return difference is minus infinity. In addition, when the top of stack contains a positive value number and the operand is negative infinity, the result returned will be negative infinity with an error flag setting. In the case of division operations, a division by zero flag, Q error, can also be indicated as set. For example, positive infinity divided by minus zero, returns the result, minus infinity, with an error flag and Q error setting indicated. (*The above-described handling of zeros, and infinity representations in connection with various operations also is depicted in Tables 3-6 which are of record in the Patent Office file pertaining to this patent.*)

It is possible with respect to each of the above examples, that the sign of the return result could be altered according to the rounding mode has been selected, namely when between two representable numbers round nearest even. For other rounding modes, an appropriate sign will be returned according to the rounding mode choice.

In addition to arithmetic operational errors, error flags can be set and remedial action taken in response to transfers and manipulations of numbers by floating point instructions to and from memory, and within the stack. Generally, the response's nature is determined by the type of error indicated as well as the instruction in which it occurred. In each case, an interrupt is provided with appropriate error flags and indicators or it may be masked, in which case the most reliable response or return is specifically included within the design logic.

Before describing a number of examples illustrating this principle, the language structure of the present invention must first be generally understood. The instruction set is highly symmetric and orthogonal which greatly enhances its power and flexibility to the user. By symmetry and orthogonality, it is meant that the format or syntax of the instruction is uniform when used with any type of data format, and has a uniform internal syntax regardless of the operation performed, i.e. addition, subtraction, multiplication, etc.

The set of instruction is divided into three categories: a core instruction set; an extended set; and a transfer set of instructions. The core instruction set performs basic mathematical operations. Each core instruction has six forms of six types of operands. Of these five forms, four are memory referencing forms, and one a register form. The four memory reference forms each correspond to different storage representations, namely, short or long precision, and real or integer. (*The core instruction set is summarized in Table 7 which is also of record in the Patent Office file pertaining to this patent.*)

The extended set supports more esoteric mathematical functions which are applicable to the stack operands only. (*Table 8, available in the Patent Office file, summarizes this set.*)

The transfer set of instructions supports special operations, such as saving and storing various parts of the volatile state of the processor. Generally, these instructions reference memory for a source or destination. (*Table 9, also available in the Patent Office file, summarizes the transfer set of instructions.*)

Obviously, the number of examples which can be taken are numerous, and inasmuch as each action is as specific to the floating point instruction and the numerical quantities handled by the instructions as well as the source and destination, no universal example of the error indication and its response can be set forth. Therefore, consider one specific example for the purposes of illustration. Consider generally the fetch phase of a core instruction. If the operand is specified to be in a register, the contents of the register are copied into a temporary storage that will serve as an operand for computing the result. The register's address is computed by adding the register field of the instruction to the top of stack pointer, using modulus arithmetic. The address is computed at once at the start of the fetch phase and remains unchanged, independent of the top of stack until the floating point instruction is completed. An I error can be caused by two cases. The register may be empty or the number in the register may be an invalid. Consider specifically the instruction, LOAD. If the error is unmasked, the circuitry of the present invention will stop and generate an interrupt. If the error was masked, the non number for "indefinite" will be loaded.

The error conditions are detected by tag logic circuit 140 of FIG. 8. The instructions are decoded using well-known microcode design principles. The errors I,D, Q, indicating zeros, invalids, empty, and denormalized numbers, are generally identified by examining the tags and by using the exponent logic circuit 142 coupled to exponent bus 49. As each number is loaded into file 50, circuit 142 will test the exponent using random logic to determine if any of the above error conditions exist. The tag will be appropriately loaded under microcode control into tag logic circuit 140 and thence for storage into file 50. After a number has been loaded into FEU 32, O, U, or P errors can occur and will again be detected by exponent logic circuit 142 according to the data type which has been selected for output.

Because the operands are all formatted with 80 bit lengths, the precision of the results of calculation are independent of the precision of the operands since all internal registers accommodate the file formal. Results then are forced to real, real long, or other data formats depending upon the outside destination. All exceptions (I,O,U,D,Q and P) (status flags) are detected and an interrupt is generated if the exception is not masked. If an interrupt is not generated, exception handling is available in the numeric data processor of the present invention and a saving or read out of the exception flags, a pointer to the instruction causing the interrupt, and a pointer to the data if memory was addressed. Zero and infinity arithmetic are particularly provided for as part of the internal exception handling, including both offine and projective infinity.

The numeric data processor permits instructions that load and store either the control word in the case of rounding, precision, or infinity arithmetic and exception handling or the entire environment and storage of the exception flags.

The capability of the numeric data processor of the present invention is also extended as well as its reliability. As previously stated, six data types in addition to the file format can be accepted by the data processor by virtue of conversion of each of the data formats to the accompanying or generalized file format.

Exact arithmetic is accomplished by including an inexact exception, "P", along with its mask. If a rounding error is committed, the correctly rounded result is delivered and the "P" flag is set. If the mask, "PM", is zero, an interrupt is generated, otherwise execution simply continues. This permits accounting functions to be carried out and allows them to be protected from round off error. (*Table 10 in the Patent Office file lists the errors which may result and the corresponding responsive actions which may be undertaken for various instructions. Table 10 does this for each of the instruction sets previously mentioned.*)

Through use of the rounding modes, signed zeros and infinities, interval arithmetic can be implemented by the numeric data processor. The signs on zero and infinity permit open or closed intervals when zero or infinity is an end point of an interval with the sign denoting whether the interval is open or closed.

The numeric data processor also includes several special instructions, such as the hardware executed square root, multiplication, division, and modulus reduction described above.

Many other modifications and alterations may be made to the presently illustrated embodiment without departing from the spirit and teachings of the present invention. The invention as set forth in the claims below is merely illustrated and not limited by the above description. The stack pointer is decremented and the value of the significand of the original top of stack, scaled between 1 and 2 or between −1 and −2, loaded into the new top of stack position. The "remainder" instruction is for reducing arguments and periodic functions to a primary range. The instructions allow the calculation of the exact remainder without round off error of the two top stack elements, namely the remainder is set equal to the contents of the top of stack (TOS) modulo the contents of the next top of stack (TOS 1). The remainder is returned to the top of stack and the next top of stack remains unchanged.

Cordic approximations of transcendental functions are accomodated in the numeric data processor of the present invention in hardware. The inclusion of "decompose" and "remainder" instruction facilitate argument reduction necessary for transcendental function calculations. Cordic approximations can be computed in FEU 32 to obtain transcendental function in hardware, such as exponents, logarithms, tangents and arctangents. The Decompose instruction overrides the contents of the top of stack with the integral value of the exponent of the top of stack as expressed in the file format.

V. SUMMARY AND ADVANTAGES OF THE INVENTION

Each of the above aspects of the invention, when taken together, result in significant improvements in integrated circuit numeric data processors. The numeric processor of the present invention is fast enough for many scientific and statistical calculations; accurate enough for business and commercial computations; precise enough for new applications like interval arithmetic; provides an unprecendented level of capability, safety and reliability with high performance and low cost. The numeric processor is primarily characterized by the fact that all data types, long and short real, long and short integer, compact BCD, and integer word are converted to an internal file or temporary real format of 80 bits in length. The internal stack within the numeric processor, the exponent and fraction buses, the arithmetic unit, and all shifters and registers are designed to operate with an 80 bit word, including three additional rounding bits (GRS) and where appropriate, a tag bit. The file format has a explicit leading bit in the significand and thus allows unnormalized as well as normalized arithmetic.

*As alluded to above, conversion of all external formats, including integer formats, to the single internal file format described above provides for high computational efficiency, precision and accuracy. Error treatment is especially difficult if several different internal data formats and corresponding levels of precision of intermediate results must be considered. However, the present invention uses only one internal file format, thereby simplifying error anaylsis and treatment.*

*Furthermore, the extra extended precision of the internal file format over all external representations protects most computations from suffering any serious roundoff error. For most computations, an answer good to about one unit in the last place only requires a modest extra precision. The present invention provides such precision even for data appearing externally in a double format.*

*Underflow and overflow problems are almost always avoided with the present invention. The extra range of the exponent in the internal file format protects almost all intermediate computations from underflow or overflow. And final results are usually in a resonable range.*

*Allowance is made for unnormalized numbers. These numbers have lost precision, but by keeping them around until final results are delivered, they often disappear (e.g., by being added to a larger number)and thus do not detract from overall precision. However, if they do not go away, their manner of representation indicates the final loss of precision.*

Various mathematical expressions, known for approximating functions, such as the polynomial approximation. Maclaurin series, successive divisions, and Padeh approximations, are examined with the purpose of determining how many elements in the series are required in order to obtain less than a specified degree of error, it is readily demonstrable that the only way in which the number of elements in the series can be kept within a reasonable bounds is to limit the domain of the argument in the approximation series. After the result is calculated, there must be some way in which the domain is then built back up to encompass the original domain of numbers which the numeric processor is designed to handle. Cordic approximations are well-known to the art and the general approach is to reduce the argument to create a very small remainder using pseudo-divides, to create a series of pseudo-quotients. The approximate value of the function of the remainders are then computed followed by reconstruction of the function with the correct argument using pseudo-multiplications with the pseudo-quotients. The algorithm of the cordic approximation are well-known, somewhat complex and need not be repeated here. The exact point to which the argument need to be reduced will depend upon the accuracy desired, the mathematical approximation used and the function to be calculated. Microcode control applied (according to ordinary design considerations) is used to implement these argument reductions and approximation calculations. The pseudo-divisions and pseudo-multiplications are implemented as loops using additions and subtractions employing mathematical constants from ROM 63 and the operand or remainder function. Shifts are required in the cordic algorithm which are controlled by the loop count. Loop counter 162 is provided for this purpose and is coupled both to multiplexer 148 and to ROM pointer logic 164 which in turn controls the read out from ROM 63. Essential to the hardware implementation of the cordic approximations is a flexible loading into a programmable shifter from multiple sources. For example, shifter 52 can be variably controlled through multiplexer 148; by loop counter 162, which is loaded from a microcode immediate field as well as the variable loop count; by bit or byte portion of leading zero counter 154; from any source coupled to fraction bus 48 through shift count register 126; from rounding parameter table 158 through register 126; and by both the shift count from counter 126 or its complement as may be required and as is selectively provided by shift count selection circuit 166. Without this combination of elements, cordic approximations could not be implemented in an integrated circuit chip of practical size or at sufficient speed and accuracy.

TABLE 2

| | |
|---|---|
| (a) | ADD-SUBTRACT - Global ADD-SUBTRACT F. P. Instructions are re-classified as local ADD MAGNITUDE SUBTRACT MAGNITUDE according to the signs of the operands. |
| | (1) ADD MAGNITUDE - No special handling of unnormalized operands. |
| | (2) SUBTRACT MAGNITUDE - Two cases occur after the exponents have been made equal by unnormalization of the fraction with the smaller original exponent: |
| | (i) If neither fraction is normalized, then leave the difference unnormalized and round as is. |
| | (ii) If either fraction is normalized, then normalize the difference prior to rounding. |
| (b) | MULTIPLY - Needs no special handling. |
| (c) | DIVISION - If Divsor is unnormalized, trap: if dividend is unnormalized, carry on like any other division. |
| (d) | COMPARE - Flag any Unnormalized as D-error, carry on comparison after normalizing as much as possible, check & react to D-error at end. |
| (e) | SQRT - Trap on a unnormalized number argument. |
| (f) | MOD - Like Divide, Notice that if Divident is unnormalized the remainder will still be a normalized result. |
| (g) | STORE (REAL) - An unnormalized number whose exponent is above the underflow boundary will cause an I-error. In the underflow range U-error will occur. |
| (h) | Integer Part of TOP - Pre-normalize as much as possible without causing underflow. |
| (i) | LOAD File Format - If a number with zero exponent, non-zero fraction is encountered the tags are set to invailid and the D-error is set. If unmasked it will cause Interrupt upon completion. |

We claim:

1. An improvement in a numeric data processor for performing calculations on a plurality of data formats representable by a fraction and exponent representation comprising:

first means for converting said plurality of data formats to a file format having a fraction and exponent representation wherein said file format has a numeric fraction and exponent domain greater than any one of said plurality of data format;

a fraction and exponent bus coupled to said first means;

a stack of registers configured to store numeric information in said file format, said stack coupled to said exponent and fraction bus;

an arithmetic unit to perform arithmetic operations on said information in said file format, said arithmetic unit being coupled to said fraction bus; and means for rounding said numeric information in a selected one of a plurality of modes, wherein said means for rounding includes a three bit register for storing a guard, round and sticky bit corresponding to a numeric quantity, said sticky bit being the Or-function of all right shifted bits from said numeric quantity beyond the bit location of said guard and round bits.

[2. An improvement in a numeric data processor for performing calculations on numeric quantities comprising:

first means for detecting and indicating numeric exceptions during computational operation and handling of said numeric quantities wherein said exceptions include signed zeros and infinity;

second means for selectively masking a response to said numeric exceptions;

third means for selectively providing a specific response to each said exception when said exception is masked, said third means being coupled to said second and first means;

means for rounding said numeric quantities in a selected one of a plurality of modes, wherein said means for rounding includes a three bit register for storing a guard, round and sticky bit corresponding to said numeric quantity, said sticky bit being the exclusive-or function of all right shifted bits from one of said numeric quantities.]

[3. An improvement in a method for calculating numeric quantities having a plurality of data formats representable by a fraction and exponent representation in a numeric processor comprising the steps of:

converting said plurality of data formats to a file format in a conversion means wherein said file format has an exponent and fraction numeric domain greater than any one of said plurality of data formats;

storing said converted data format in file format within a stack of registers;

selectively coupling said file format numeric quantities to a fraction and exponent bus;

selectively coupling said file format numeric quantities to an arithmetic unit and performing arithmetic operations in file format thereon; and rounding said numeric quantities in one of a plurality of modes by means for rounding, wherein said means for rounding includes a three bit register for storing a guard, round and sticky bit corresponding to a numeric quantity, said sticky bit being the exclusive-or function of all right shifted bits from said numeric quantity beyond the bit location of said guard and round bits.]

[4. An improvement in a method for calculating numeric quantities comprising the steps of:

detecting every numeric exceptions during computational operations in a numeric processor;

indicating the nature of said exceptions detected in a status register;

generating a response in hardware within said numeric processor specific to the indicated exception without generating an interrupt signal, including the exception of operations employing and resulting in signed zeros and infinity; and selectively masking said generated response.]

5. An improvement in a numeric data processor for performing calculations on a plurality of data formats representable by a fraction and exponent representation comprising:

first means for converting said plurality of data formats to a file format having a fraction and exponent representation wherein said file format has a numeric fraction and exponent domain greater than any one of said plurality of data formats;

a fraction and exponent bus coupled to said first means;

a stack of registers configured to store numeric information in said file format, said stack coupled to said exponent and fraction bus;

an arithmetic unit to perform arithmetic operations on said information in said file format, said arithmetic unit being coupled to said fraction bus;

means for rounding said numeric information in a selected one of a plurality of modes; and means for performing exact arithmetic including a P flag register and PM mask register, wherein said P flag register is set if rounding occurs within said means for rounding and an interrupt is generated by an interrupt means, and wherein if said PM mask register is set, execution continues without interrupt generation with a rounded result generated by said means for rounding, whereby reliability of calculation is increased.

[6. An improvement in a numeric data processor for performing calculations on mumeric quantities comprising:

first means for detecting and indicating numeric exceptions during computational operation and handling of said numeric quantities wherein said exceptions included signed zeros and infinity;

second means for selectively masking a response to said numeric exceptions;

third means for selectively providing a specific response to each said exception when said exception is masked, said third means being coupled to said second and first means;

means for rounding said numeric quantities in a selected one of a plurality of modes; and means for performing exact arithmetic including a P flag register and PM mask register, wherein said P flag register is set if rounding occurs within said means for rounding and an interrupt is generated by an interrupt means, and wherein if said PM mask register is set, execution continues without interrupt generation with a rounded result generated by said means for rounding, whereby every exception during numeric processing is detected and indicated and if masked, will be provided with a response so that calculation may proceed in a reliable manner.]

7. An improvement in a method for calculating numeric quantities having a plurality of data formats representable by a fraction and exponent representation in a numeric processor comprising the steps of:

converting said plurality of data formats to a file format in a conversion means wherein said file format has an exponent and fraction numeric domain greater than any one of said plurality of data formats;

storing said converted data format in file format within a stack of registers;

selectively coupling said file format numeric quantities to afraction and exponent bus;

selectively coupling said file format numeric quantities to an arithmetic unit and performing arithmetic operations in file format thereon;

rounding said numeric quantities in one of a plurality of modes by a means for rounding;

selectively setting a P flag register if rounding occurs; and generating an interrupt if a PM mask register is not set, otherwise generating a rounded result.

8. An improvement in a numeric data processor for performing calculations on a plurality of data formats representable by a fraction and exponent representation comprising:

first means for converting said plurality of data formats to a file format having a fraction and exponent representation wherein said file format has a numeric fraction and exponent domain greater than any one of said plurality of data formats;

a fraction and exponent bus coupled to said first means;

a stack of registers configured to store numeric information in said file format, said stack coupled to said exponent and fraction bus;

an arithmetic unit to perform arithmetic operations on said information in said file format, said arithmetic unit being coupled to said fraction bus;

second means for detecting and indicating numeric exceptions during computational operation and handling of said information;

third means for selectively masking a response to said numeric exceptions; and fourth means for selectively providing a specific response in hardware and without the generations of an interrupt signal to each said exception when said exception is masked, said fourth means being coupled to said second and third means, whereby every exception during numeric processing is detected and indicated, and if masked, will be provided with a response so that calculation may proceed in a reliable manner.

[9. An improvement in a numeric data processor for performing calculations on numeric quantities comprising:

first means for detecting and indicating numeric exceptions during computational operation and handling of said information wherein said exceptions include signed zeros and infinity;

second means for selectively masking a response to said numeric exceptions; and third means for selectively providing a specific response in hardware and without generating an interrupt signal, said third means being coupled to said second and first means, whereby every exception during numeric processing is detected and indicated and if masked, will be provided with a response so that calculation may proceed in a reliable manner.]

10. An improvement in a method for calculating numeric quantities having a plurality of data formats representable by a fraction and exponent representation in a numeric processor comprising the steps of:

converting said plurality of data formats to a file format in a conversion means wherein said file format has an exponent and fraction numeric domain greater than any one of said plurality of data formats;

storing said converted data format in file format within a stack of registers;

selectively coupling said file format numeric quantities to a fraction and exponent bus;

selectively coupling said file format numeric quantities to an arithmetic unit and performing arithmetic operations in file format thereon;

reconverting a file format numeric quantity in said stack of registers by said conversion means into a selected one of said plurality of data formats;

detecting and indicating numeric exceptions during said steps of converting, reconverting, performing arithmetic operations in an error detection means; and selectively providing a specific response to each said exception in hardware without generating an interrupt signal when said exception is masked by an error handling means.

* * * * *

UNITED STATES PATENT AND TRADEMARK OFFICE

CERTIFICATE OF CORRECTION

PATENT NO. : Re. 33,629

DATED : July 2, 1991

INVENTOR(S) : John F. Palmer, Bruce W. Ravenel, Rafi Nave

It is certified that error appears in the above—identified patent and that said Letters Patent is hereby corrected as shown below:

| | | |
|---|---|---|
| Column 3, | line 13-14 | Delete "which is comprised of a first bidirectional shifter". |
| Column 4, | line 42 | Change "formulas" to "formats". |
| | line 61 | Change "of" to "or". |
| Column 5, | line 49 | Change "(31)" to "(-1)". |
| Column 6, | line 12 | Change "32 bits) to "(32)" |
| | line 64 | After "dummy" insert --read--. |
| | line 65 | After "will not" insert --enter--. |
| Column 7, | line 10 | After "it will" insert --use the address captured during the dummy read by--. |
| | line 21 | After "instruction" insert --,--. |
| | line 63 | Change "Processed" to "proceed". |
| Column 8, | line 11 | Change "BIU 20" to "BIU 30". |
| | line 12 | After "application" insert --,--. |
| | line 16 | Change "921,083" to "921,082". |

UNITED STATES PATENT AND TRADEMARK OFFICE

CERTIFICATE OF CORRECTION

PATENT NO. : Re. 33,629

DATED : July 2, 1991

INVENTOR(S) : John F. Palmer, Bruce W. Ravenel, Rafi Nave

It is certified that error appears in the above—identified patent and that said Letters Patent is hereby corrected as shown below:

| | |
|---|---|
| Column 8, line 40 | Delete "shown". |
| line 54 | Change "register" to "registers". |
| line 55 | Change "mathemetical" to "Mathamatical". |
| line 62 | Change "bit" to "but". |
| line 67 | Change "in" to "is". |
| Column 9, line 23 | Change "onto" to "into". |
| Column 10, line 17 | Change "213" to "23". |
| line 35 | Change "bases" to "basis". |
| line 44 | Change "if" to "it". |
| line 52 | Change "the" to "in". |
| line 64 | Change "applications" to "application". |
| Column 11, line 49 | Change "coupled" to "couples". |

UNITED STATES PATENT AND TRADEMARK OFFICE

CERTIFICATE OF CORRECTION

PATENT NO. : Re. 33,629

DATED : July 2, 1991

INVENTOR(S) : John F. Palmer, Bruce W. Ravenel, Rafi Nave

It is certified that error appears in the above—identified patent and that said Letters Patent is hereby corrected as shown below:

| | | |
|---|---|---|
| Column 12, | line 28 | Change "78" to "70". |
| | line 36 | Change "50" to "80". |
| | line 45 | Change "The" to "This" |
| | line 51 | Change "84" to "54". |
| | line 54 | Change "130" to "150". |
| Column 13, | line 19 | Change "-1011" to "-1011 1100". |
| | line 41 | After "in" insert --a--. |
| | line 67 | Change "slip" to "skip". |
| Column 14, | line 16 | Change "slip" to "skip". |
| Column 15, | line 57 | Change "somewhat" to "somewhere". |
| Column 16, | line 23 | Change "similarly" to "Similarly". |
| Column 18, | line 32 | Change "3" to "8". |
| | line 35 | Change "work" to "word". |

UNITED STATES PATENT AND TRADEMARK OFFICE

CERTIFICATE OF CORRECTION

PATENT NO. : Re. 33,629

DATED : July 2, 1991

INVENTOR(S) : John F. Palmer, Bruce W. Ravenel, Rafi Nave

It is certified that error appears in the above—identified patent and that said Letters Patent is hereby corrected as shown below:

| | |
|---|---|
| Column 19, line 46 | After "denormalized", insert --in order to perform the operation, the present invention--. |
| Column 20, line 49 | Change "be" to "the". |
| Column 21, line 20 | After "zero" insert --error--. |
| line 30 | Delete "Has been selected" and insert --chosen. In the above, the default rounding mode has been selected--. |
| line 59 | Change "of" to "for". |
| Column 24, line 11 | Change "a" to "an". |

Signed and Sealed this

Twenty-eighth Day of June, 1994

Bruce Lehman

*Attest:*

BRUCE LEHMAN

*Attesting Officer*

*Commissioner of Patents and Trademarks*